(12) United States Patent
Zipper et al.

(10) Patent No.: US 12,428,093 B1
(45) Date of Patent: Sep. 30, 2025

(54) VEHICLES

(71) Applicant: Dryft Board LLC, Los Angeles, CA (US)

(72) Inventors: Ralph Zipper, Melbourne, FL (US); Skyler Olsen, Denver, CO (US); Nicholas Bartolotta, Los Angeles, CA (US)

(73) Assignee: Dryft Board LLC, Los Angeles, CA (US)

( * ) Notice: Subject to any disclaimer, the term of this patent is extended or adjusted under 35 U.S.C. 154(b) by 0 days.

(21) Appl. No.: 18/913,750

(22) Filed: Oct. 11, 2024

(51) Int. Cl.
*B62K 3/00* (2006.01)
*B62K 13/04* (2006.01)

(52) U.S. Cl.
CPC .............. *B62K 3/002* (2013.01); *B62K 13/04* (2013.01)

(58) Field of Classification Search
CPC ... B62K 3/002; B62K 13/04; B62K 2015/001
See application file for complete search history.

(56) References Cited

U.S. PATENT DOCUMENTS

| | | |
|---|---|---|
| 1,607,972 A | 11/1926 | Wagner |
| 4,417,743 A | 11/1983 | Garel |
| D295,428 S | 4/1988 | Cummings |
| D295,989 S | 5/1988 | Cummings |
| 4,750,754 A | 6/1988 | Lennon |
| D300,756 S | 4/1989 | Cummings |
| 4,863,182 A | 9/1989 | Chern |
| 4,991,066 A | 2/1991 | McCowan |
| 5,127,488 A | 7/1992 | Shanahan |
| 5,158,515 A | 10/1992 | Cortes Turcios |
| 5,263,725 A | 11/1993 | Gesmer et al. |
| 5,461,753 A | 10/1995 | Rounds |
| 5,620,189 A | 4/1997 | Hinderhofer |
| 5,775,452 A | 7/1998 | Patmont |
| 5,833,252 A | 11/1998 | Strand |
| 5,975,546 A | 11/1999 | Strand |
| D444,184 S | 6/2001 | Kettler |
| 6,250,656 B1 | 6/2001 | Ibarra |
| D449,860 S | 10/2001 | Lin |

(Continued)

FOREIGN PATENT DOCUMENTS

| | | |
|---|---|---|
| EP | 3318415 A1 | 5/2018 |
| GB | 1503154 A | 3/1978 |
| WO | WO2024034871 A1 | 2/2024 |

OTHER PUBLICATIONS

U.S. Appl. No. 18/352,993, filed Jul. 14, 2023.

*Primary Examiner* — Katy M Ebner
(74) *Attorney, Agent, or Firm* — Kolitch Romano Dascenzo Gates LLC

(57) ABSTRACT

Vehicles (10) comprise a forward assembly (14) and a rearward assembly (22) coupled to and extending rearward from the forward assembly (14). The forward assembly comprises a front frame assembly (16) comprising a head tube (68), a steering assembly (18) pivotally supported by the front frame assembly (16) and comprising a steering tube (70) rotatably extending through the head tube (68) and operably coupled to the front wheel (20), a front wheel (20) operably coupled to the steering assembly (18) and positioned to engage the ground surface (12), and a limiter (72) configured to selectively limit rotation of the steering tube (70) relative to the head tube (68).

19 Claims, 19 Drawing Sheets

(56) References Cited

U.S. PATENT DOCUMENTS

| | | |
|---|---|---|
| D456,461 S | 4/2002 | Koch |
| 6,390,216 B1 | 5/2002 | Sueshige et al. |
| 6,431,302 B2 | 8/2002 | Patmont et al. |
| 6,494,470 B2 | 12/2002 | Chang |
| 6,520,517 B1* | 2/2003 | Chung ................ B62K 21/00 |
| | | 280/124.11 |
| 6,690,127 B2 | 2/2004 | Birkestrand et al. |
| D487,908 S | 3/2004 | Mayer et al. |
| 6,715,779 B2 | 4/2004 | Eschenbach |
| 6,793,224 B2 | 9/2004 | Stratton |
| D533,601 S | 12/2006 | Moreira |
| 7,192,038 B2 | 3/2007 | Tsai |
| 7,213,818 B2 | 5/2007 | Chang |
| D566,787 S | 4/2008 | Lo |
| 7,540,517 B2 | 6/2009 | Wernli |
| 7,597,333 B2 | 10/2009 | Stillinger |
| 8,336,894 B2 | 12/2012 | Wernli |
| 8,424,158 B2 | 4/2013 | Steenson |
| 8,424,887 B1 | 4/2013 | Lemeur, Jr. et al. |
| 8,562,004 B2 | 10/2013 | Stillinger et al. |
| 8,602,422 B2 | 12/2013 | Wilson |
| 8,720,916 B2 | 5/2014 | Bermal |
| 8,801,008 B2 | 8/2014 | Wilson |
| 8,827,296 B2 | 9/2014 | Wernli |
| 8,939,454 B2 | 1/2015 | Stillinger et al. |
| 8,998,226 B2 | 4/2015 | Wernli |
| D740,173 S | 10/2015 | Treadway et al. |
| 9,174,692 B2 | 11/2015 | Treadway et al. |
| 9,296,443 B2 | 3/2016 | Wernli |
| 9,365,254 B1* | 6/2016 | Durrett ................ B62K 27/12 |
| 9,428,009 B2 | 8/2016 | Sharratt et al. |
| 9,533,728 B2 | 1/2017 | Wernli |
| 9,592,876 B2 | 3/2017 | Lovley, II et al. |
| 9,643,681 B2 | 5/2017 | Kettler |
| 9,757,980 B1 | 9/2017 | Jones et al. |
| 9,771,120 B2* | 9/2017 | Ku ...................... B62K 15/008 |
| 9,802,108 B2 | 10/2017 | Aders |
| 9,937,974 B2 | 4/2018 | Wernli |
| 9,950,244 B1 | 4/2018 | Sargis |
| 9,987,546 B1 | 6/2018 | Clos et al. |
| 10,058,764 B2 | 8/2018 | Aders |
| 10,099,745 B2 | 10/2018 | Hadley et al. |
| 10,189,533 B2 | 1/2019 | Lovley, II et al. |
| 10,238,952 B2 | 3/2019 | Clos et al. |
| 10,300,976 B2 | 5/2019 | Wernli |
| 10,322,332 B2 | 6/2019 | Strand |
| 11,267,526 B2 | 3/2022 | Liao |
| 11,305,830 B2* | 4/2022 | Bartolotta ............. B62K 3/002 |
| 11,439,889 B1 | 9/2022 | Pasic |
| 11,707,666 B2 | 7/2023 | Zhang |
| 12,157,532 B2 | 12/2024 | Stephens |
| 2002/0135998 A1 | 9/2002 | Chiu |
| 2002/0139591 A1 | 10/2002 | Wisecarver |
| 2003/0034622 A1 | 2/2003 | Van Ardenne |
| 2003/0052471 A1 | 3/2003 | Grafton |
| 2003/0197344 A1* | 10/2003 | Chung .................. B62K 21/00 |
| | | 280/244 |
| 2004/0012166 A1 | 1/2004 | Reginato |
| 2004/0079571 A1 | 4/2004 | Laver et al. |
| 2004/0216929 A1 | 11/2004 | White |
| 2005/0139406 A1 | 6/2005 | McLeese |
| 2005/0173175 A1 | 8/2005 | Lee |
| 2006/0042844 A1 | 3/2006 | Kirkpatrick et al. |
| 2006/0049595 A1 | 3/2006 | Crigler et al. |
| 2007/0182123 A1 | 8/2007 | Bryant |
| 2007/0187164 A1 | 8/2007 | Yang et al. |
| 2007/0235970 A1 | 10/2007 | Stillinger |
| 2007/0283523 A1 | 12/2007 | Ruckman et al. |
| 2008/0197594 A1 | 8/2008 | Ling |
| 2008/0217085 A1 | 9/2008 | Wernli |
| 2010/0013183 A1 | 1/2010 | He |
| 2010/0059956 A1 | 3/2010 | Stillinger |
| 2010/0072722 A1 | 3/2010 | Boyd et al. |
| 2010/0096823 A1 | 4/2010 | Stillinger et al. |
| 2010/0117317 A1 | 5/2010 | Smith |
| 2011/0031711 A1 | 2/2011 | Grossman |
| 2011/0266079 A1 | 11/2011 | Boyd et al. |
| 2012/0061942 A1 | 3/2012 | Kulikov et al. |
| 2013/0001909 A1* | 1/2013 | Stillinger ............... B62K 3/002 |
| | | 280/87.041 |
| 2013/0175775 A1 | 7/2013 | Bermal |
| 2013/0175777 A1 | 7/2013 | Bermal |
| 2013/0256048 A1 | 10/2013 | Chen et al. |
| 2013/0308887 A1 | 11/2013 | Gesmer |
| 2014/0090910 A1 | 4/2014 | Treadway et al. |
| 2016/0023703 A1 | 1/2016 | Braggin |
| 2016/0137250 A1* | 5/2016 | Stillinger ............... B62K 21/00 |
| | | 280/87.041 |
| 2016/0152296 A1* | 6/2016 | Eckert .................... B62K 21/12 |
| | | 280/87.041 |
| 2018/0185738 A1 | 7/2018 | Strand |
| 2019/0084605 A1 | 3/2019 | Berendzen |
| 2019/0217915 A1 | 7/2019 | Clos et al. |
| 2019/0315425 A1* | 10/2019 | Bartolotta ............... B62J 43/20 |
| 2020/0047840 A1 | 2/2020 | Newby et al. |
| 2021/0138835 A1 | 5/2021 | Peterson et al. |
| 2022/0126942 A1 | 4/2022 | Latt |
| 2022/0161888 A1* | 5/2022 | Kim ..................... G06V 40/103 |
| 2022/0185421 A1* | 6/2022 | Song ..................... B62J 45/414 |
| 2022/0258033 A1 | 8/2022 | Treadway |
| 2022/0315144 A1* | 10/2022 | Ro ....................... E05B 47/0012 |
| 2023/0202611 A1 | 6/2023 | Mori |
| 2023/0356798 A1* | 11/2023 | Chung ..................... B62K 5/10 |
| 2024/0227965 A1 | 7/2024 | Dorman |
| 2024/0382822 A1 | 11/2024 | Moore |

* cited by examiner

VEHICLES

FIELD

The present disclosure relates to vehicles.

BACKGROUND

Traditional personal wheeled vehicles, such as motorized and push/kick scooters, lack advanced maneuverability and dynamic riding characteristics of other sport boards, such as snowboards, wakeboards, and surfboards.

SUMMARY

Vehicles for riding along a ground surface comprise a forward assembly and a rearward assembly coupled to and extending rearward from the forward assembly. The forward assembly comprises a front frame assembly, a steering assembly pivotally supported by the front frame assembly, a front wheel operably coupled to the steering assembly and positioned to engage the ground surface, and a limiter. The front frame assembly comprises a head tube, and the steering assembly comprises a steering tube rotatably extending through the head tube and operably coupled to the front wheel. The limiter is configured to selectively limit rotation of the steering tube relative to the head tube. The rearward assembly comprises a deck having an upper side for supporting a rider in a standing position, and a lower side opposite the upper side. The rearward assembly further comprises a rear wheel assembly operably coupled to the deck and positioned to engage the ground surface when the front wheel engages the ground surface.

DESCRIPTION

Vehicles and various components parts thereof are disclosed herein. The various component parts, such as wheels and wheel assemblies, are not required to be used with vehicles according to the present disclosure and may be used with, or may be components of, other vehicles and/or may be used in other applications.

Figure 1:
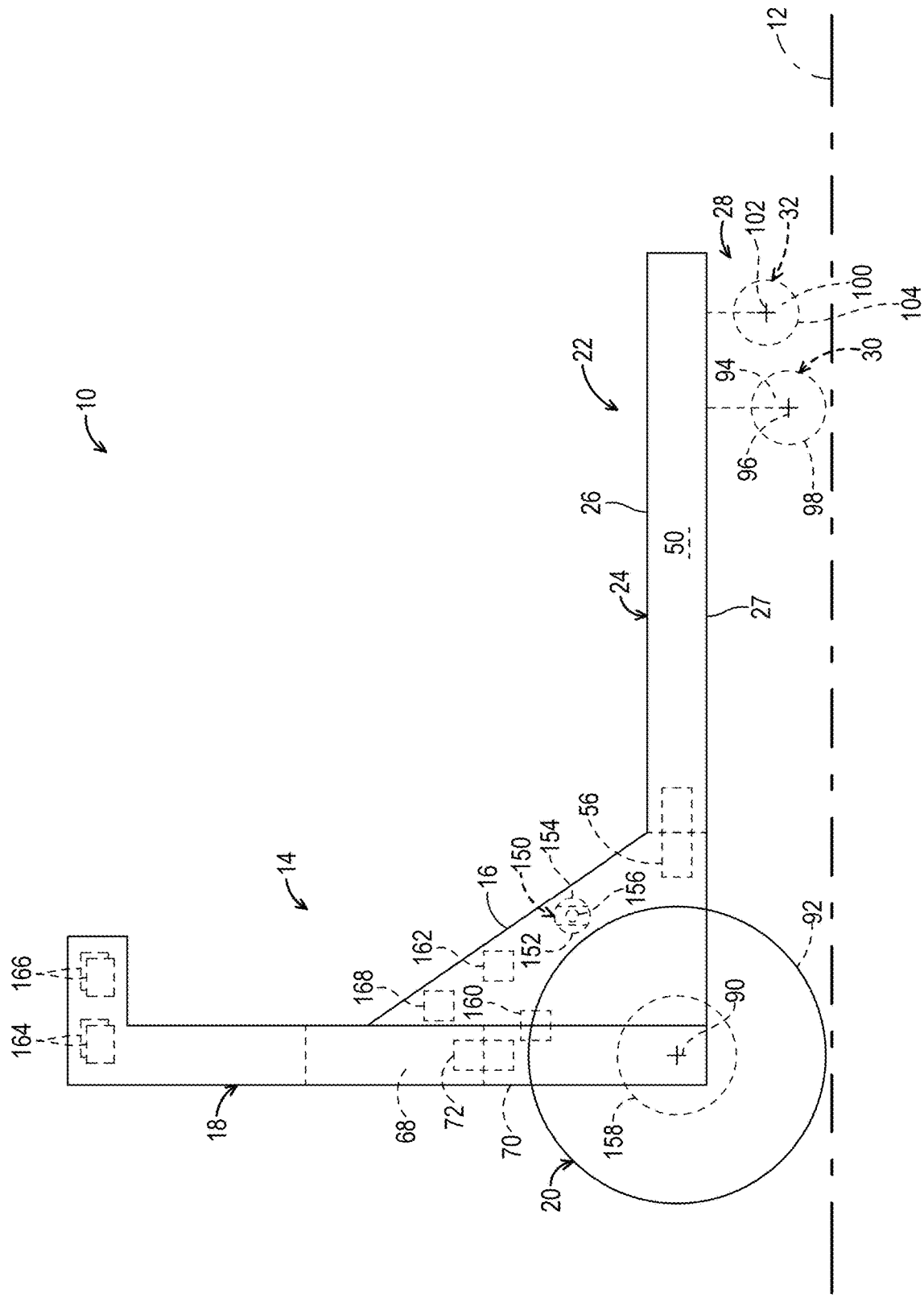
FIG. 1 is a schematic side view representing vehicles according to the present disclosure.
Figure 2:
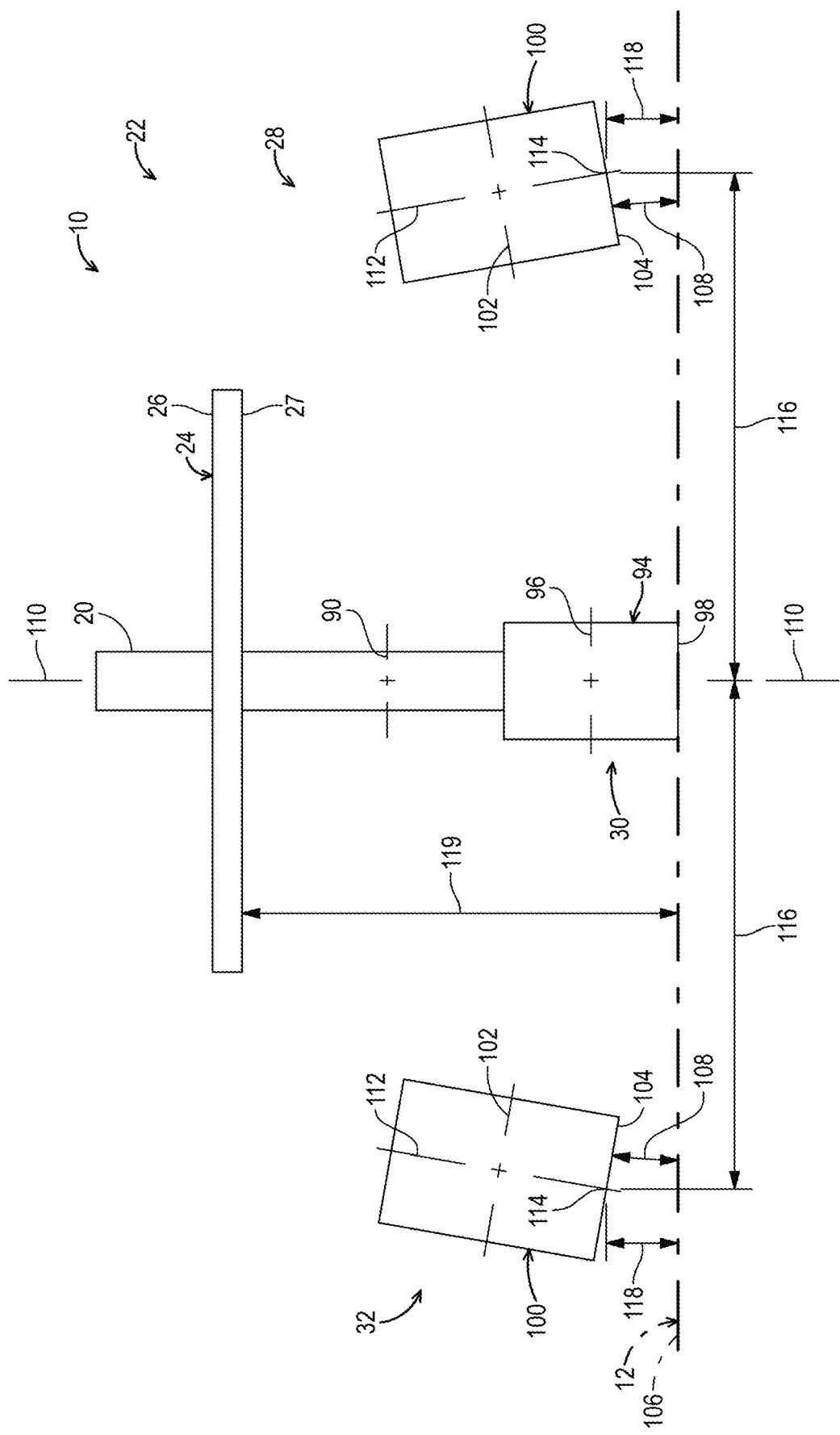
FIG. 2 a schematic rear view representing vehicles according to the present disclosure.
Figure 3:
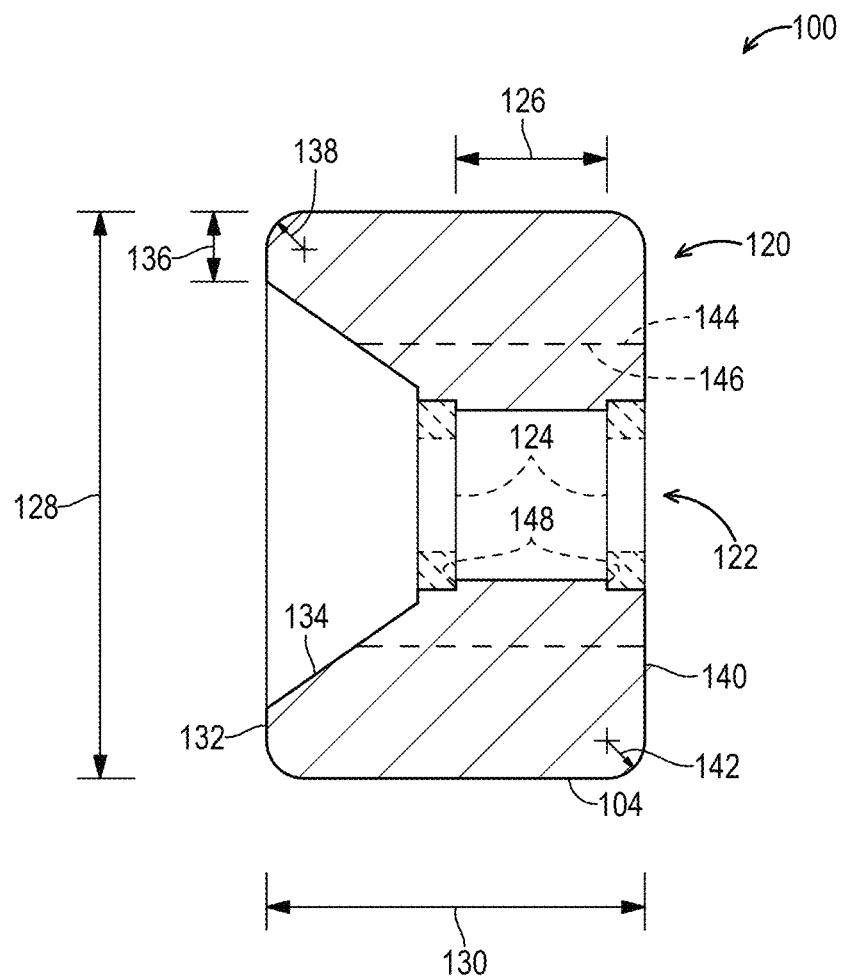
FIG. 3 is a schematic cross-sectional view representing truck wheels according to the present disclosure.

FIGS. 1-3 schematically represent vehicles and wheels. Generally in FIGS. 1-3, elements that are likely to be included in a given example are illustrated in solid lines, while elements that are optional to a given example or that correspond to a specific example are illustrated in dashed lines. However, elements that are illustrated in solid lines are not essential to all examples of the present disclosure, and an element shown in solid lines may be omitted from a particular example without departing from the scope of the present disclosure. Dash-dot lines in FIGS. 1 and 2 represent environment.

Herein, the terms "forward," "rearward," "front," "rear," "left," "right," "upper", "lower" and the like are relative terms used to describe position, location, and/or direction of vehicles and components thereof, and should be interpreted with the vehicle in an upright position on a flat ground surface and having a primary direction of "forward" travel. The term "lateral" means away from a centerline or center plane of a referenced structure, and the term "medial" means toward a centerline or center plane of a referenced structure.

With reference to FIG. 1, vehicles 10 according to the present disclosure are for riding along a ground surface 12 and generally comprise at least a forward assembly 14 and a rearward assembly 22. The forward assembly 14 comprises a front frame assembly 16, a steering assembly 18 that is rotationally, or pivotally, supported by the front frame assembly 16, and a front wheel 20 that is operably coupled to the steering assembly 18 and that is positioned to engage the ground surface 12. The rearward assembly 22 is coupled to and extends rearward from the forward assembly 14. The rearward assembly 22 comprises a deck 24 and a rear wheel assembly 28 that is operably coupled to the deck 24 and that is positioned to engage the ground surface 12 when the front wheel 20 engages the ground surface 12. The deck 24 has an upper side 26 for supporting a rider in a standing position, and a lower side 27 that is opposite the upper side 26.

The deck 24 additionally or alternatively may be described as or referred to as a board and may take a variety of configurations. For example, the deck 24 may comprise at least a main body 50 that is configured similar to or that has characteristics of other board sport boards, like scooters, skateboards, wakeboards, and snowboards. In particular, the main body 50 of the deck 24 may be generally planar and/or may be contoured like modern day skateboard decks to facilitate a secure footing on the upper side 26 of the deck 24. The main body 50 may be constructed of any suitable material, including one or more of wood, wood laminate, plastic, fiber glass, fiber reinforced plastic, composite, etc., and may include features such as one or more grip surfaces and/or textures on the upper side 26 thereof. The deck 24 may be appropriately sized to receive one or two or more riders in a standing position at a given time. As illustrative examples only, the deck 24 may have a length in the range of 400-1000 millimeters (mm) and a width in the range of 100-400 mm.

In some examples of vehicles 10, the rearward assembly 22, including the deck 24, is configured to be selectively detached from and reattached to the forward assembly 14. In such examples, a user may remove the rearward assembly 22 to perform maintenance on the rearward assembly 22, such as on the rear wheel assembly 28, and/or to install a different (e.g., new or differently configured) rearward assembly 22. For example, multiple configurations of rearward assemblies 22, including decks 24 and rear wheel assemblies 28, may be provided to enable a user to select a specific rearward assembly 22 for a particular application or riding characteristic. For example, some rearward assemblies 22 may be configured for on-road use while others may be configured for off-road use. Some rearward assemblies 22 may be configured for racing while others may be configured for recreational activities. Some rearward assemblies 22 may be configured for beginner riders, while others may be configured for more expert riders. Some rearward assemblies 22 may be configured for more aggressive drifting or powersliding, while others may be configured for more conservative drifting or powersliding. Some rearward assemblies 22 may be configured for only a single rider while others may be configured for more than one rider. Other variations and applications for rearward assemblies 22, including decks 24 and rear wheel assemblies 28 are within the scope of the present disclosure. Additionally, the rearward assembly 22 may be selectively removed from the forward assembly 14 to facilitate travel, shipping, and/or storage of the vehicle 10.

As schematically represented in FIG. 1, in some examples, the forward assembly 14 and the rearward assembly 22 collectively define a quick-disconnect assembly 56 that is configured to selectively release and secure the rearward assembly 22 from and to the forward assembly 14. The quick-disconnect assembly 56, when present, permits the removal of the rearward assembly 22 from the forward assembly 14 without the use of hand tools (e.g., screw drivers or wrenches), yet still provides a secure, fixed attachment between the forward assembly 14 and the rearward assembly 22 during operative use of the vehicle 10. In some examples, the quick-disconnect assembly 56 is operable solely by engagement with a user's hand or hands.

As also schematically represented in FIG. 1, in some examples of vehicles 10, the front frame assembly 16 comprises a head tube 68, and the steering assembly 18 comprises a steering tube 70 that rotatably extends through the head tube 68 and that operably is coupled to the front wheel 20. Accordingly, selective rotation of the steering tube 70 by a rider will cause the front wheel 20 to rotate relative to the head tube 68 for operative steering of the vehicle 10. In some examples of vehicles 10, the forward assembly 14 further comprises a limiter 72 that is configured to selectively limit rotation of the steering tube 70 relative to the head tube 68. For example, in some examples, the limiter 72 limits rotation, or pivoting, of the steering tube 70 to a defined angular span, such as to prevent a rider from rotating the front wheel 20 beyond a threshold angle relative to the head tube 68. For example, the angular span may be less than 180 degrees (°) or less. In some examples, the limiter 72 may be configured between a limiting configuration, in which rotation of the steering tube 70 is limited, and a non-limiting configuration, in which rotation of the steering tube 70 is not limited. Additionally or alternatively, some limiters 72 may be configured to be selectively configured between a first configuration, in which the steering tube 70 is limited to an angular range of rotation relative to the head tube 68, and a second configuration, in which the steering tube 70 is limited to no rotation relative to the head tube 68. This second configuration may be useful, for example, while a user performs maintenance on the vehicle 10. Additionally, in some examples, by limiting the steering tube 70 to no rotation relative to the head tube 68, the vehicle 10 may be inverted and placed on a ground surface, with the steering assembly 18 and the rearward assembly 22 serving as a tripod configuration, without worry of the steering assembly 18 rotating and causing instability of the inverted vehicle 10. When so positioned, a user may perform maintenance on the vehicle and/or may remove and/or replace the rearward assembly 22.

With continued reference to FIG. 1, in some examples of vehicles 10, the rear wheel assembly 28 comprises one or more caster assemblies 30 that are operably coupled to the deck 24 opposite the upper side 26, and a truck assembly 32 that is operably coupled to the deck 24 opposite the upper side 26 and rearward of the one or more caster assemblies 30. In some examples, a single caster assembly 30 is present and is centered along the deck 24. In some examples, two caster assemblies 30 are present and equally spaced from a center line of the deck 24.

Such vehicles 10 may be described as drift vehicles and/or as being configured to facilitate drifting and/or powersliding maneuvers by riders. In other words, the rearward assembly 22 of the vehicle may be configured to be rotatable to a range of angles relative to the direction of motion during controlled operation of the vehicle 10, and/or to "drift" or "powerslide" relative to the direction of vehicle motion. Examples of similar drifting vehicles are disclosed in U.S. Pat. No. 11,305,830, the disclosure of which is incorporated herein by reference.

FIG. 2 schematically illustrates such a rear wheel assembly 28 comprising a single caster assembly 30 and a truck assembly 32. Caster assemblies 30 generally comprise a caster wheel 94 that is configured to pivot about an axis that is perpendicular or transverse to the caster wheel's rotational axis, and in particular that is transverse to the deck 24. Examples of caster assemblies 30 that may be incorporated into a rear wheel assembly 28 of a vehicle 10 are disclosed in U.S. patent application Ser. No. 18/352,993, the disclosure of which is incorporated herein by reference.

Truck assemblies 32 may take a variety of configurations, but generally include a pair of truck wheels 100 that are configured to move vertically or pivot relative to the deck 24 and that have a neutral configuration, to which the truck assembly 32 is spring-biased and in which both truck wheels 100 are equidistant from the deck 24. Some truck assemblies 32 may be configured similar to skateboard truck assemblies, with a single axle, to which both truck wheels 100 are operably mounted, and that is configured to pivot relative to the deck 24. Other truck assemblies 32 may comprise a separate axle associated with each truck wheel 100 that individually is configured to pivot relative to the deck 24, with such truck assemblies 32 optionally being described as defining an independent suspension configuration.

As schematically represented in FIG. 2, the caster assembly 30 comprises a caster wheel 94 having a caster-wheel axis 96 and a caster-wheel ground-contacting surface 98, and the truck assembly 32 comprises a pair of truck wheels 100. Each truck wheel 100 has a truck-wheel axis 102 and a truck-wheel ground-contacting surface 104. In some examples, the truck-wheel ground-contacting surface 104 is cylindrical or generally cylindrical; however, the truck-wheel ground-contacting surface 104 also may be frustoconical and or become frustoconical over time as the truck-wheel ground-contacting surface 104 is worn down through use. Additionally, the truck-wheel ground-contacting surface 104 may have texture or a tread pattern and is not required to be smooth.

The front wheel 20 has a front-wheel axis 90 and a front-wheel ground-contacting surface 92 (FIG. 1), and with reference to FIG. 2, the geometry of the vehicle 10, including the rearward assembly 22 and the rear wheel assembly 28, may be referenced, and is described herein, when (i) the front-wheel axis 90 and the caster-wheel axis 96 are parallel to a planar ground surface 106, (ii) the front-wheel ground-contacting surface 92 and the caster-wheel ground-contacting surface 98 are engaged with the planar ground surface 106, (iii) and the truck assembly 32 is in a neutral configuration.

In particular, when the vehicle 10 is in such a reference configuration, (i) the truck-wheel ground-contacting surface 104 and/or the truck-wheel axis 102 of each truck wheel 100 may be described as being at a truck-wheel angle 108 relative to the planar ground surface 106, (ii) the vehicle 10 may be described as having a vehicle center plane 110 that bisects the vehicle 10 and that is perpendicular to the planar ground surface 106, (iii) the closest distance from an intersection 114 of the truck-wheel center plane 112 and the truck-wheel ground-contacting surface 104 closest to the planar ground surface 106 to the vehicle center plane 110 may be described as a truck-wheel track 116, (iv) a closest distance from the intersection 114 to the planar ground surface 106 may be described as a truck-wheel height 118, and (v) a closest distance from the lower side 27 of the deck 24 to the planar ground surface 106 may be described as a deck height 119.

In some examples, the truck-wheel angle 108 is non-zero. In some such examples, the truck-wheel angle 108 is 1-5°, 1-3°, or 1-2°. In some examples, the truck-wheel track 116 is 150-500 millimeters (mm), 150-400 mm, 150-300 mm, 150-250 mm, 200-500 mm, 200-400 mm, 200-300 mm, or 200-250 mm. In some examples, the truck-wheel height 118 is 5-80 mm, 5-60 mm, 5-40 mm, 5-30 mm, 5-20 mm, 5-10 mm, 10-50 mm, 10-40 mm, 10-30 mm, 10-20 mm, 10-15 mm, or about 22 mm. In some examples, the deck height 119 is 70-200 mm, 70-150 mm, 70-120 mm, 90-200 mm, 90-150 mm, 90-120 mm, or about 111 mm. In some examples, a ratio of the truck-wheel track 116 to the truck-wheel height 118 is 15-30, 15-25, 15-20, 20-30, 20-25, or about 22. In some examples, a ratio of the truck-wheel track 116 to the deck height 119 is 0.5-5, 0.5-4, 0.5-3, 1-5, 1-4, 1-3, 2-5, 2-4, 2-3, or about 2.1. In some examples, a ratio of the deck height 119 to the truck-wheel height 118 is 5-20, 5-15, 5-12, 10-20, 10-15, 10-12, or about 10.4. Herein, the term "about" when used in reference to a value means within 5% of the value, inclusive of the value itself.

Selections of values and ratios thereof within these various ranges are not arbitrary and may be selected such as based on the overall dimensions of the vehicle 10, including the rearward assembly 22 and the rear wheel assembly 28, and/or on the desired applications and drifting and/or powersliding characteristics of the vehicle 10. For example, values of the truck-wheel angle 108 and/or the truck-wheel track 116 may be selected to achieve a particular amount or quality of contact between the truck-wheel ground-contacting surface(s) 104 and the ground surface 12 during a drifting maneuver. In some examples, values of the truck-wheel angle 108 and/or the truck-wheel track 116 may be selected to maximize contact between each respective ground-contacting surface 104 and the ground surface 12 during a drifting maneuver, for instance values resulting in parallel or flush contact between truck-wheel ground-contacting surface 104 and the ground surface 12. In other words, the geometry of the rear wheel assembly 28 may be chosen so that the truck-wheel angle 108 reaches zero (or any other desired angle) on a side of the vehicle 10 where the truck wheel 100 contacts the ground surface 12 during a drifting maneuver. Values and ratios outside of the ranges and ratios expressly enumerated herein also are within the scope of the present disclosure.

Turning now to FIG. 3, examples of truck wheels 100 are schematically presented. As schematically illustrated, generally, each truck wheel 100 comprises at least a body 120 that defines an axle bore 122, and a pair of roller bearings 124 that are operatively received within the axle bore 122. As schematically represented in FIG. 3, the pair of roller bearings 124 may be described as being spaced apart by a bearing spacing 126, and each truck wheel 100 may be described as having a truck-wheel diameter 128 and a truck-wheel width 130.

In some examples of truck wheels 100, the bearing spacing 126 is at least 12 mm, 11-25 mm, 12-25 mm, 13-25 mm, 14-25 mm, 11-20 mm, 12-20 mm, 13-20 mm, 14-20 mm, about 14 mm, about 15 mm, or about 16 mm. This is in contrast to standard skateboard truck wheels, which generally have a bearing spacing in the range of 8 to 10 mm, which spacing may be unsuitable for vehicles 10 according to the present disclosure that specifically are configured for drifting and powersliding maneuvers.

In some examples, a ratio of the truck-wheel diameter 128 to the bearing spacing 126 is 4-10, 5-10, 6-10, 4-9, 4-8, 4-7, 5-7, or about 6. In some examples, a ratio of the truck-wheel width 130 to the bearing spacing 126 is 1-5, 2-5, 3-5, 3-4, or about 3⅓. In some examples, a ratio of the truck-wheel diameter 128 to the truck-wheel width 130 is 1-2.5, 1.2-2.5, 1.4-2.5, 1-2, 1.2-2, 1.4-2, 1.6-2, or about 1.8.

Selections of values within these various ranges are not arbitrary and may be selected such as based on the overall dimensions of the vehicle 10, including the rearward assembly 22 and the rear wheel assembly 28, and/or on the desired applications and drifting and/or powersliding characteristics of the vehicle 10. Values and ratios outside of the ranges and ratios expressly enumerated herein also are within the scope of the present disclosure. In particular, the bearing spacing 126 may be critical to maintain stability of a vehicle 10 during a drifting or powersliding maneuver (i.e., to avoid vibrations induced in the truck wheels 100 induced by the friction with the ground surface 12).

With continued reference to FIG. 3, in some examples of truck wheels 100, the body 120 has a lateral sidewall 132 and a recess 134 that extends from the lateral sidewall 132 toward the axle bore 122. The lateral sidewall 132 may be described as having a sidewall depth 136 from the truck-wheel ground-contacting surface 104 to the recess 134. In some examples of truck wheels 100, such as schematically represented in FIG. 3, the recess 134 is frustoconical or approximately frustoconical, such as with a slight concave or bowl shape.

In some examples, the sidewall depth 136 is 5-15 mm, 7-15 mm, 5-12 mm, 7-12 mm, 7-10 mm, about 10 mm, or about 9 mm. In some examples, a ratio of the truck-wheel diameter 128 to the sidewall depth 136 is 5-15, 7-15, 9-15, 5-12, 7-12, 9-12, or about 10. In some examples, a ratio of the truck-wheel width 130 to the sidewall depth 136 is 3-9, 3-7, 5-7, 5-6, or about 5.5. In some examples, a transition between the truck-wheel ground-contacting surface 104 to the lateral sidewall 132 has a radius of curvature 138 of 2-10 mm, 2-8 mm, 2-6 mm, 4-10 mm, 4-8 mm, 4-6 mm, or about 5 mm. In some examples, the body 120 has a medial sidewall 140 opposite the lateral sidewall 132, and a transition between the truck-wheel ground-contacting surface 104 to the medial sidewall 140 has a radius of curvature 142 of 2-10 mm, 2-8 mm, 2-6 mm, 4-10 mm, 4-8 mm, 4-6 mm, or about 5 mm.

Selections of values within these various ranges are not arbitrary and may be selected such as based on the overall dimensions of the vehicle 10, including the rearward assembly 22 and the rear wheel assembly 28, and/or on the desired applications and drifting and/or powersliding characteristics of the vehicle 10. Values and ratios outside of the ranges and ratios expressly enumerated herein also are within the scope of the present disclosure. In particular, the various dimensions and ratios thereof of truck wheels 100 may be critical to maintain stability of a vehicle 10 during a drifting or powersliding maneuver (i.e., to avoid vibrations induced in the truck wheels 100 induced by the friction with the ground surface 12, to avoid excessive chirping, and to avoid so-called high-siding when the friction between a forward edge of a truck wheel 100 and the ground surface 12 surpasses a threshold and causes the entire vehicle 10, and rider thereof, to uncontrollably pivot forward and potentially crash).

With continued reference to FIG. 3, in some examples of truck wheels 100, the body 120 comprises a core 144 that defines the axle bore 122, and a tire 146 that is operatively coupled to the core 144 and that defines the truck-wheel ground-contacting surface 104. In some such examples, the core 144 and the tire 146 are constructed of different materials. For example, the core 144 may be constructed of a hard plastic, and the tire 146 may be constructed of polyurethane.

Turning back to FIG. 1, in some examples of vehicles 10, the forward assembly 14 further comprises a pair of opposing frame sliders 150 that are operably supported by and that extend laterally from the front frame assembly 16. A frame slider is a structure, such as often used on motorcycles, to protect components of the motorcycle should the motorcycle inadvertently be laid-over, whether knocked-over or during a crash. Frame sliders 150 additionally or alternatively may be described as or referred to as slider pegs, frame pegs, or skid pegs.

In some examples of vehicles 10, each frame slider 150 is generally cylindrical, although other shapes also may be utilized. In some examples, each frame slider 150 is 30-100 mm long. In some examples, each frame slider 150 is positioned within 100 mm, 200 mm, or 300 mm of the deck 24 and/or within 100 mm, 200 mm, 300 mm, or 400 mm of the ground surface 12.

As schematically represented in FIG. 1, in some examples of vehicles 10, each frame slider 150 comprises one or more of a forward-facing light(s) 152, a rearward-facing light(s) 154, and/or a lateral-facing light(s) 156. Stated differently, in some examples of vehicles 10, one or more a forward-facing light 152, a rearward-facing light 154, and/or a lateral-facing light 156 are integrated into the frame sliders 150. In some examples, the integral lights are configured to illuminate portions of an underlying riding surface to the lateral sides of the vehicle 10 and/or are positioned so that typical lines of sight of observers are not blocked by the rider of the vehicle 10. Typical electric scooters and motorcycles, for example, have lights integrated at the very rear of the vehicle. However, when vehicles 10 according to the present disclosure are configured with a removable rearward assembly 22, such as described herein, having lights integrated into the rearward assembly 22 would require a complex electrical connection between the forward assembly 14 and the rearward assembly 22, for example if an associated battery were supported by the front frame assembly 16, or would require a battery supported by the rearward assembly 22. In examples of vehicle 10 with a powered front wheel 20, inclusion of a separate battery associated with rear lights would result in added weight and expense. Accordingly, integrating lights with the frame sliders 150 supported by the front frame assembly 16 is advantageous and takes advantage of a power source already present as part of the forward assembly 14. Moreover, integrating lights into frame sliders adds additional functionality to vehicles 10 not present in standard electric push scooters, for example.

Moreover, by being positioned on the frame sliders 150 that extend laterally away from the front frame assembly 16, the lights will be readily visible to the front and rear of the vehicle, without a rider blocking the lights from the rear. In addition, by having the frame sliders 150, and thus the integral lights, within a certain distance of the ground surface 12, enhanced visibility may be achieved without creating a blinding beam angle such as those created by lighting placed higher on the vehicle. Another advantage of integrating lights with the frame sliders 150 as part of the forward assembly 14 is that during a drift or powerslide maneuver of the vehicle 10, in which the rearward face of the vehicle is skewed possibly up to almost 90° relative to the direction of travel, at least one of the frame sliders 150 will be visible from behind the vehicle 10. Similarly, during a drifting maneuver, the illumination provided by frame sliders 150 may extend to some extent in lateral directions relative to the overall direction of vehicle motion, providing the rider with enhanced visibility of the underlying riding surface that drifting portions of the vehicle (i.e., the angled board) is approaching.

The forward-facing light(s) 152 may serve as headlights, such as during operation of the vehicle in reduced light settings. The rearward-facing light(s) 154 may serve as brake lights, and one or more of the forward-facing light(s) 152, the rearward-facing light(s) 154, and/or the lateral-facing light(s) 156 may serve as signal indicators (i.e., blinkers) and/or as running lights that serve to increase the visibility of the vehicle 10. In addition, the forward-facing lights and the lateral-facing lights may serve to provide illumination of the riding surface. In particular, as described previously, the lateral-facing lights 154 may provide enhanced illumination of portions of the underlying riding surface as they are approached by the board during a drifting maneuver.

With continued reference to FIG. 1, the forward assembly 14 of some vehicles 10 may comprise one or more of a battery 162, one or more user controls 164, one or more user displays 166, one or more sensors 160, and one or more controllers 168 that are configured to control various aspects of vehicle 10, including the battery 162, the user controls 164, the user displays 166, the sensors 160. Additionally, a controller 168 may be configured to communicate with a separate computing device, such as a smart phone via wireless signals. Examples of user controls 164 include throttles, brake levers, on/off switches, etc. Examples of user displays 166 include display screens, light emitting diodes (LEDs), dials, etc. for communicating such information as speed, battery life, mode, etc. Examples of sensors 160 include speedometers and drift sensors. A drift sensor is a sensor that is configured to measure a drift position of the vehicle 10, which may be defined as an angle of the rearward assembly 22 relative to the direction of travel, an angle between the front wheel 20 and the rearward assembly 22, an angle between the steering tube 70 and the head tube 68, and the like. Additional sensors may measure the pitch, roll, and/or yaw of one or more structures of the vehicle 10, such as relative to the ground surface 12.

In some examples of vehicles 10, a throttle is configured to send signals to the controller 168, which in turn sends a power signal to a motor for operation of the vehicle 10. In typical recreational wheeled vehicles, such as electric push scooters, the motor controller is configured to prevent roll-back (i.e., backward rotation of the drive wheel) and/or to turn-off or disengage the motor when roll-back is sensed. A controller 168 of a vehicle 10, on the other hand, may be configured to permit motor roll-back (i.e., to allow backward rotation of the front wheel 20 and to not turn-off or disengage the motor during roll-back). Such a configuration may facilitate certain drifting and/or powersliding maneuvers by a vehicle 10. For example, backward rotation of the front wheel 20 can occur when a drifting maneuver includes significant pivoting of the rearward assembly 22 relative to the direction of travel of the vehicle 10. To control the drift or powerslide, the rider must be able to overcome the backward rotation of the front wheel 20 and power out of the drift/slide with forward rotation of the wheel. If the front wheel 20 is not permitted to spin backward or if the controller 168 were to cause the motor to disengage or turn-off during backward rotation of the front wheel 20, powering out of the drift/slide may be difficult or even impossible.

The controller 168 may be any suitable device or devices that are configured to perform the functions of the controller discussed herein. For example, the controller may include one or more of an electronic controller, a dedicated controller, a special-purpose controller, a special-purpose computer, a display device, a logic device, a memory device, and/or a memory device having computer-readable media suitable for storing computer-executable instructions for implementing aspects of vehicles 10 according to the present disclosure.

Turning now to FIGS. 4-26, illustrative non-exclusive examples of vehicles 10 and components thereof, including rearward assemblies 22, decks 24, and truck wheels 100 are illustrated. Where appropriate, the reference numerals from the schematic illustrations of FIGS. 1-3 are used to designate corresponding parts of the embodiments of FIGS. 4-26; however, the embodiments of FIGS. 4-26 are non-exclusive and do not limit the present disclosure to these illustrated embodiments. That is, vehicles 10 and the various components discussed herein may incorporate any number of the various aspects, configurations, characteristics, properties, etc. that are illustrated in and discussed with reference to the schematic representations of FIGS. 1-3 and/or the embodiments of FIGS. 4-26, as well as variations thereof, without requiring the inclusion of all such aspects, configurations, characteristics, properties, etc. For the purpose of brevity, each previously discussed component, part, portion, aspect, region, etc., or variants thereof may not be discussed, illustrated, and/or labeled again with respect to the embodiments of FIGS. 4-26; however, it is within the scope of the present disclosure that the previously discussed features, variants, etc. may be utilized with the embodiments of FIGS. 4-26.

Figure 4:
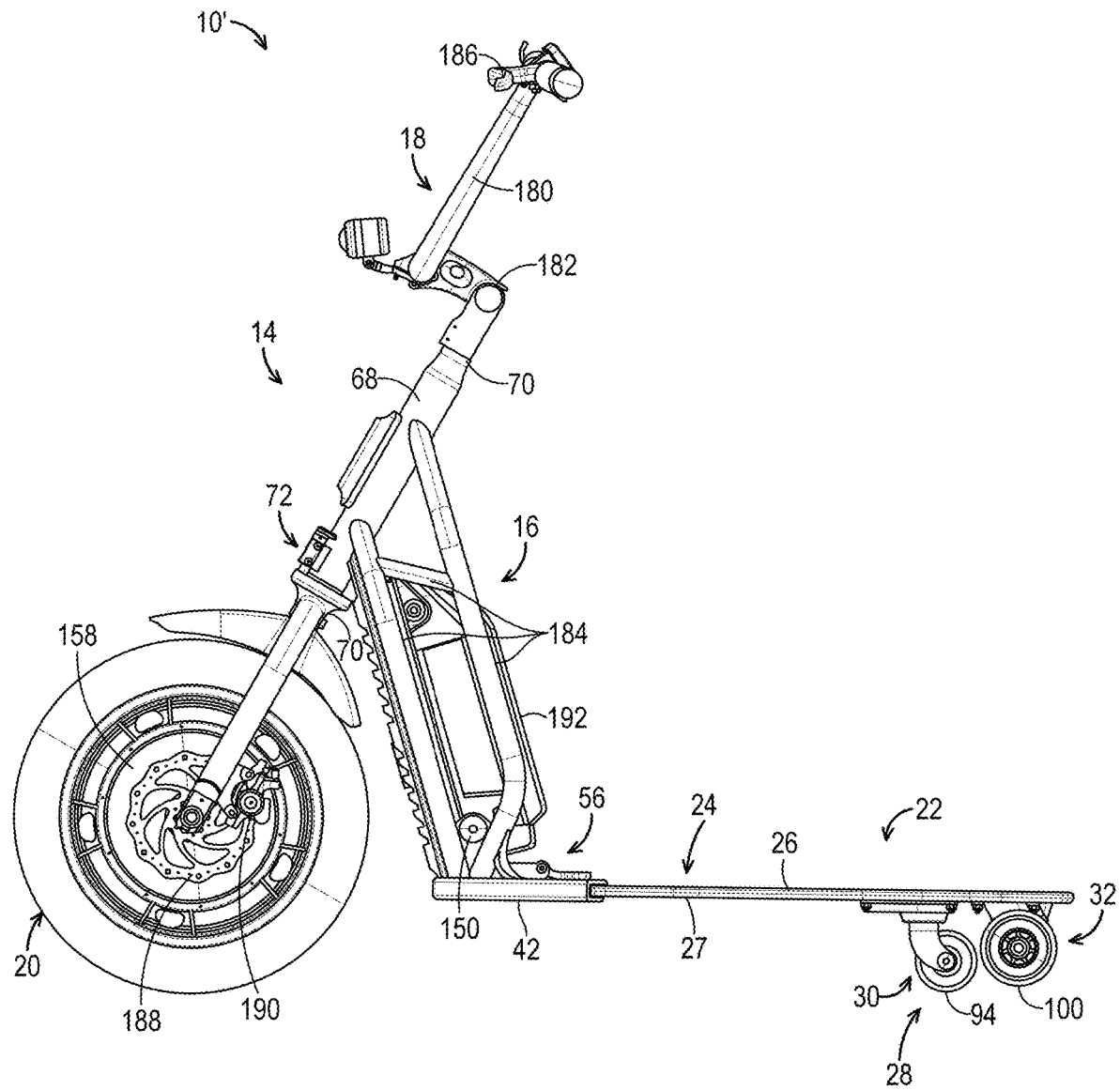
FIG. 4 is a side view of an example vehicle according to the present disclosure.
Figure 5:
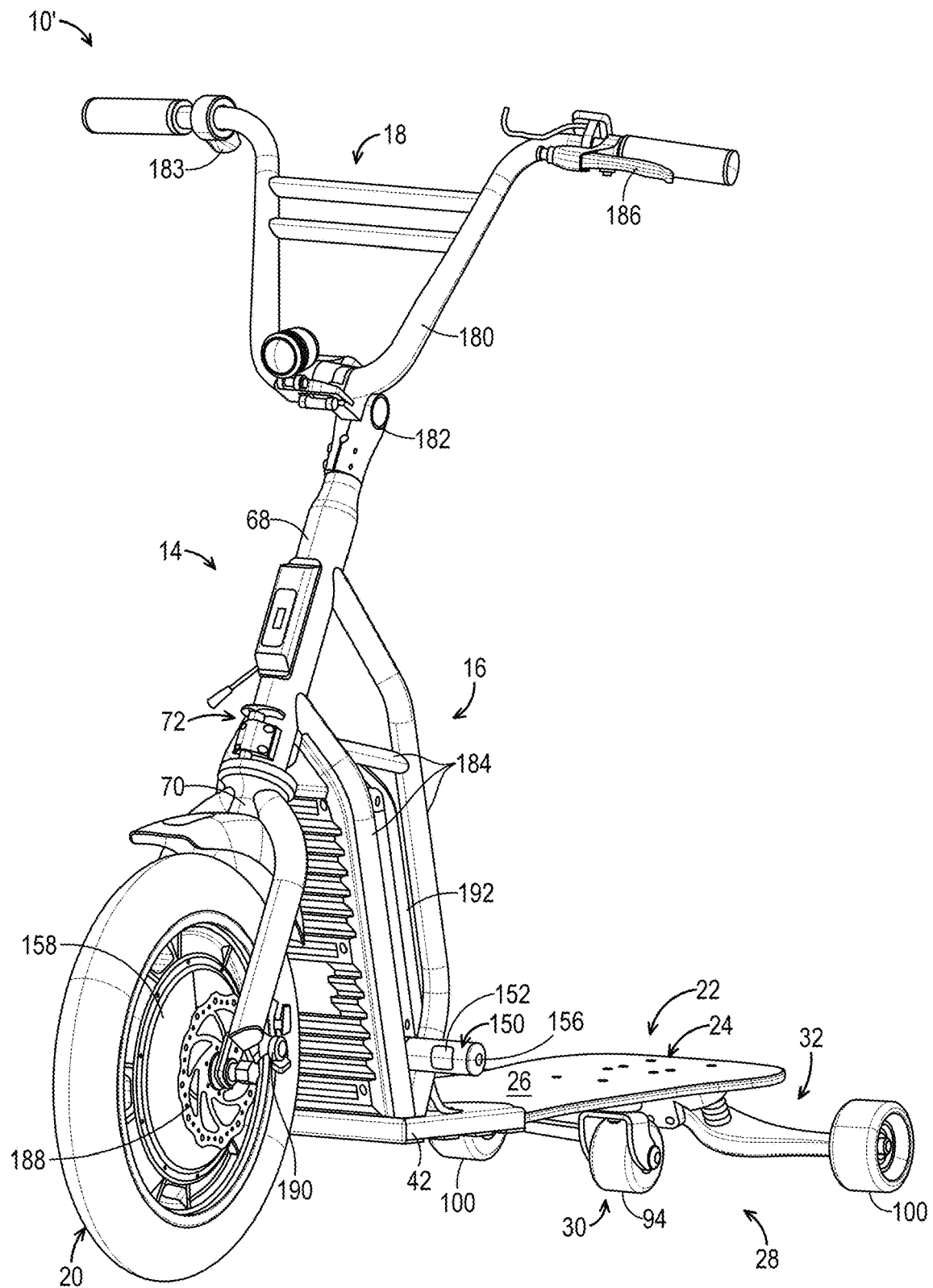
FIG. 5 is a front angled view of the vehicle of FIG. 4.
Figure 6:
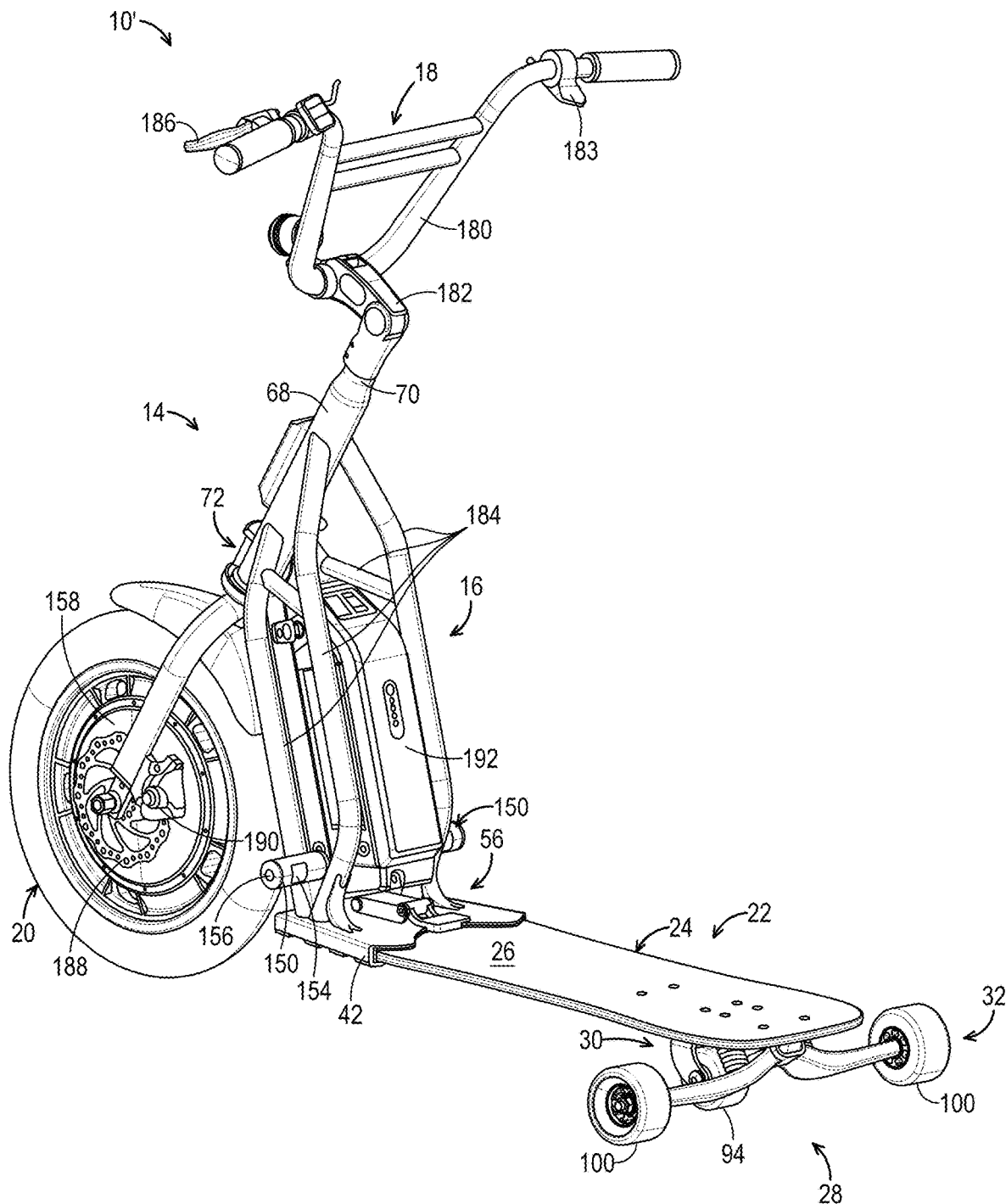
FIG. 6 is rear angled view of the vehicle of FIG. 4.

Vehicle 10' of FIGS. 4-17 is an example of a vehicle 10 whose rearward assembly 22 is selectively detachable from the forward assembly 14, whose rear wheel assembly 28 comprises a caster assembly 30 and a truck assembly 32, and whose front wheel 20 is powered with a hub motor 158. Accordingly, vehicle 10' is an example of a drifting vehicle and generally comprises the various structures and features discussed above with respect to FIGS. 1-4, including a quick-disconnect assembly 56, a limiter 72, and frame sliders 150. Moreover, as best seen in FIGS. 4-6, the steering assembly 18 of vehicle 10' comprises a stem 182 coupled to the steering tube 70 and handlebars 180 operably coupled to the stem 182. Front frame assembly 16 comprises frame members 184 operably coupled between the head tube 68 and a deck-receiving bracket 42. The forward assembly 14 of vehicle 10' further comprises a throttle 183 and a brake lever 186 supported by the handlebars 180, a brake disc 188 operably coupled to the front wheel 20, a brake caliper 190 supported by the steering assembly 18, and a rechargeable battery pack 192 supported by the front frame assembly 16.

Figure 7:
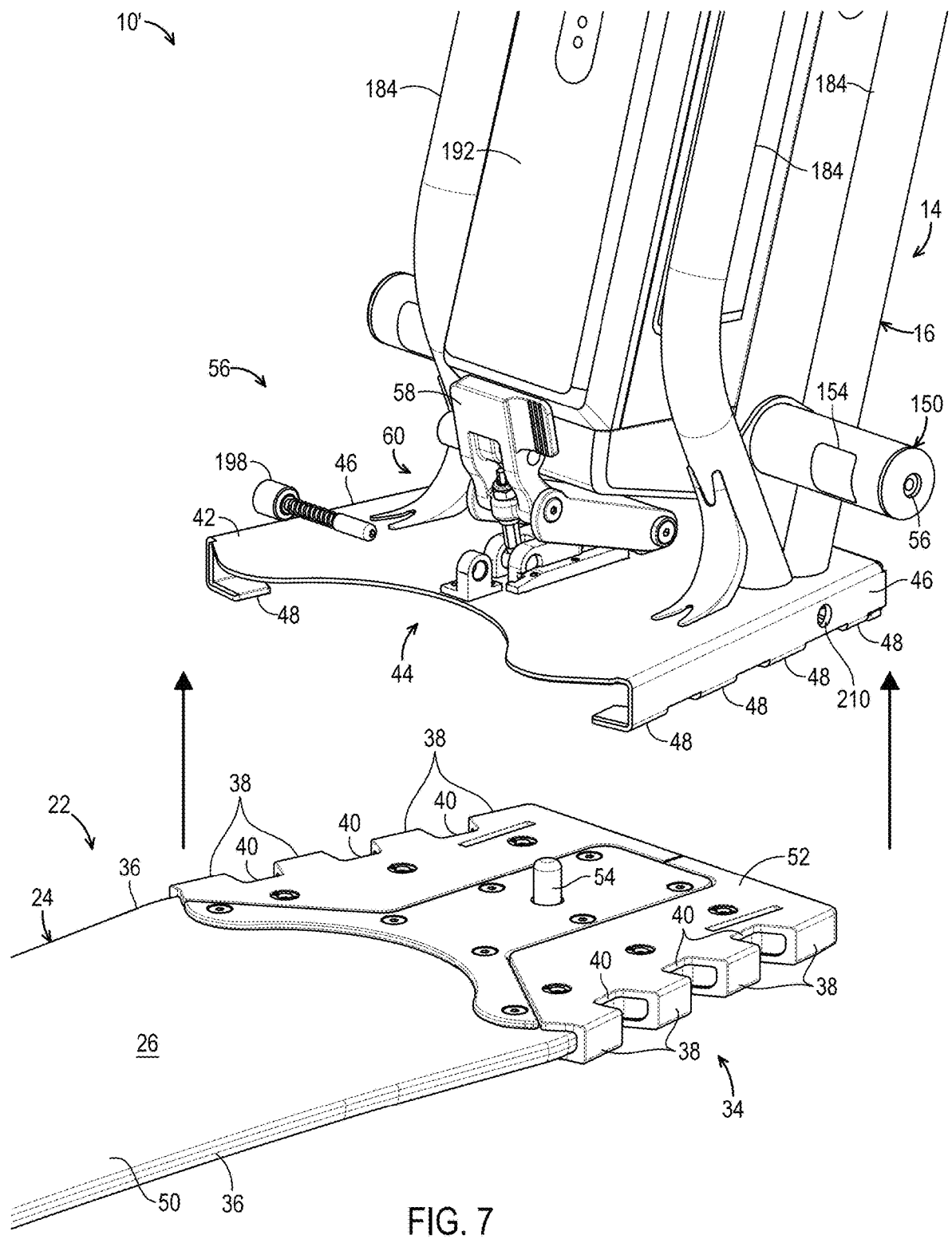
FIG. 7 is a detailed partially exploded view of the vehicle of FIG. 4, showing operative attachment of the rearward assembly to the forward assembly of the vehicle.
Figure 8:
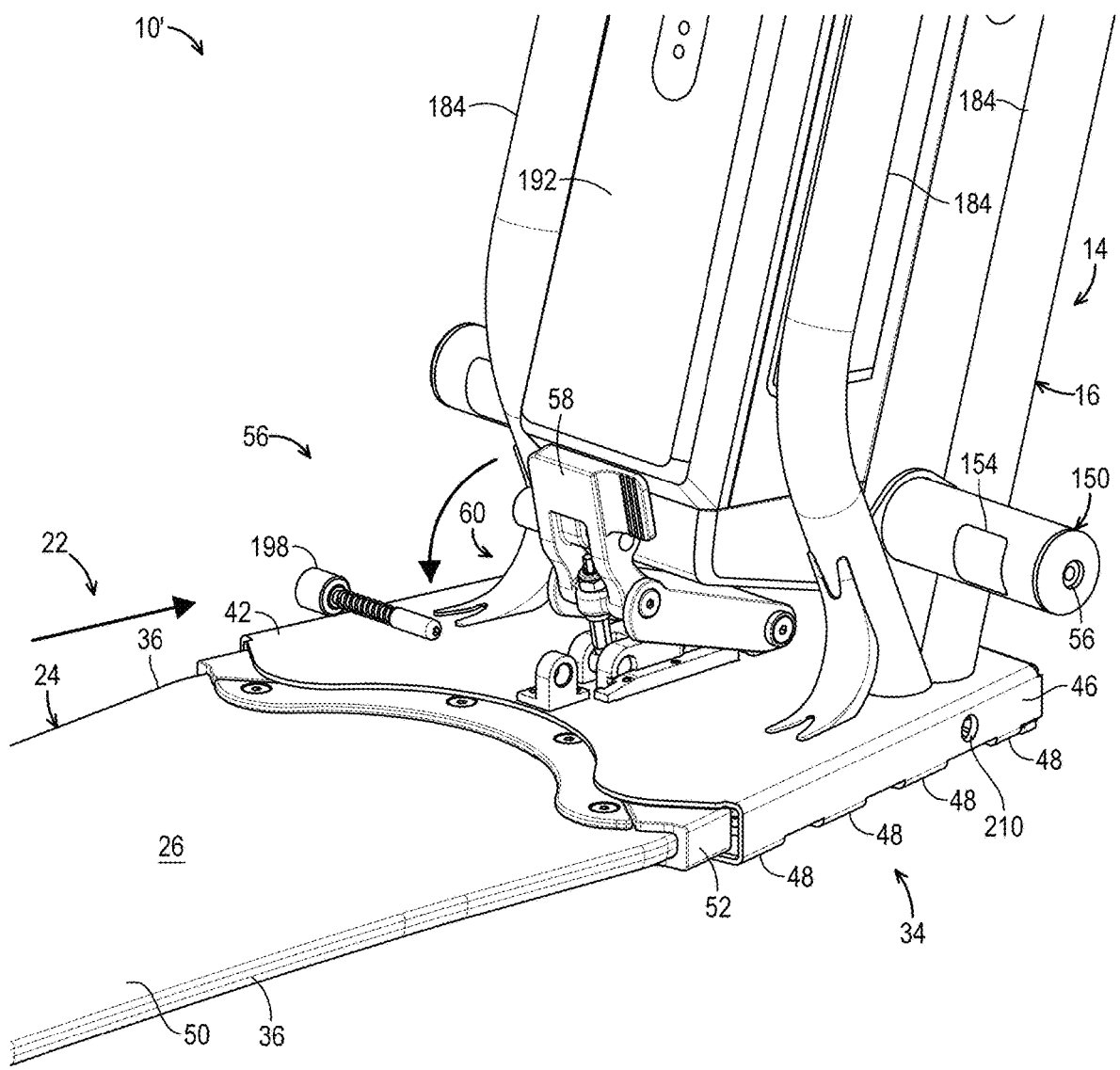
FIG. 8 is another detailed view of the vehicle of FIG. 4, showing operative attachment of the rearward assembly to the forward assembly of the vehicle in sequence with FIG. 7.
Figure 9:
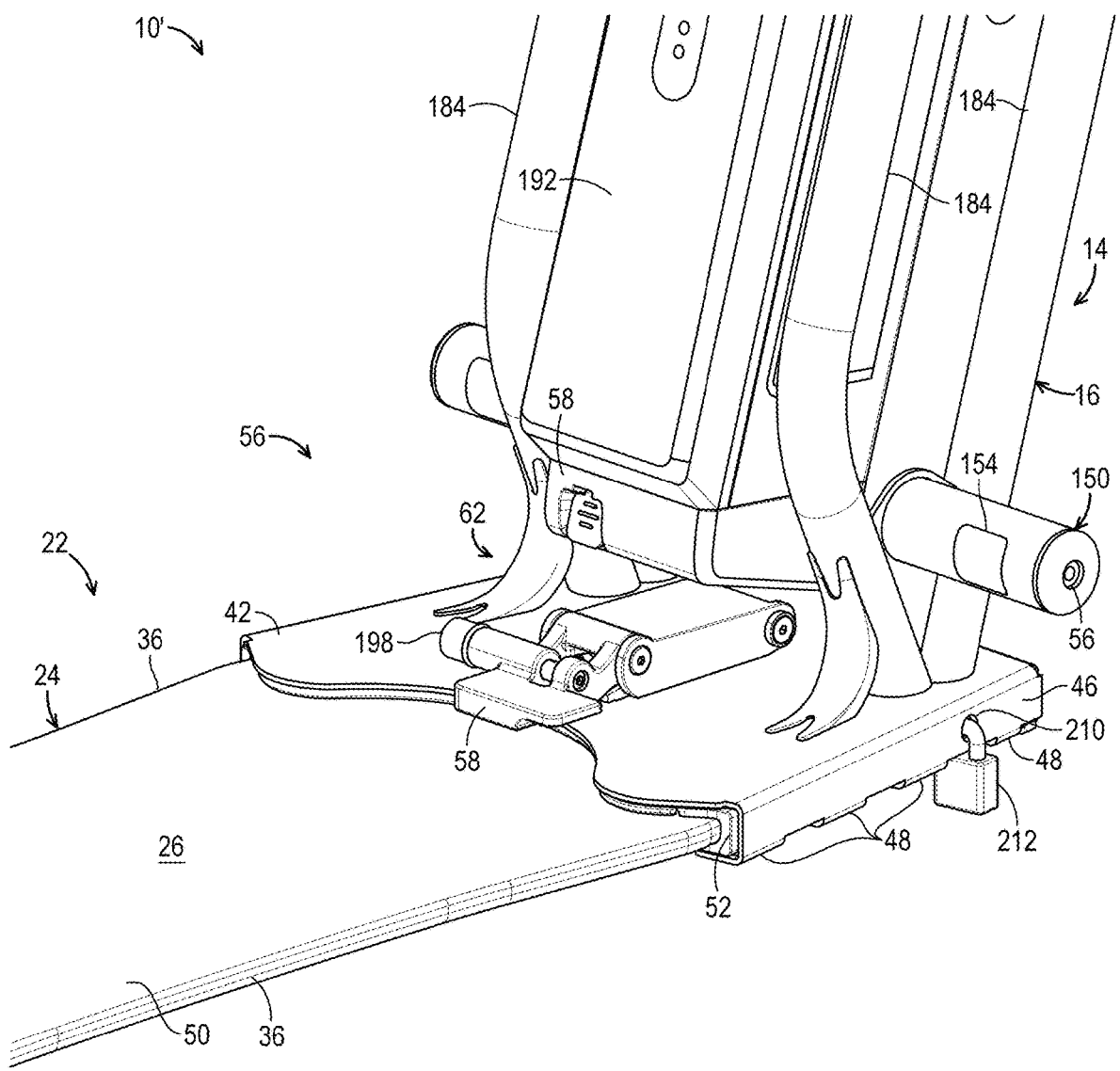
FIG. 9 is another detailed view of the vehicle of FIG. 4, showing operative attachment of the rearward assembly to the forward assembly of the vehicle in sequence with FIGS. 7 and 8.

Turning to FIGS. 7-11, the forward assembly 14 and the rearward assembly 22 of vehicle 10' collectively define a quick-disconnect assembly 56. The deck 24 of vehicle 10' may be described as having a forward deck region 34 and lateral sides 36, and as best seen in FIG. 7, the deck 24 of vehicle 10' comprises a plurality of protrusions 38 that extend from the lateral sides 36 within the forward deck region 34 and a plurality of notches 40 that extend into the lateral sides 36 within the forward deck region 34 between adjacent pairs of the plurality of protrusions 38. The forward assembly 14 of vehicle 10' comprises a deck-receiving bracket 42 that is operably supported by the front frame assembly 16 and that defines a volume 44 that is configured to selectively receive the forward deck region 34. The deck-receiving bracket 42 comprises lateral sidewalls 46 and a plurality of retaining shelves 48 that extend medially from the lateral sidewalls 46. As seen in the sequence of FIGS. 7-9, the plurality of protrusions 38 are sized to selectively pass between the plurality of retaining shelves 48 for receipt of the forward deck region 34 into the volume 44 (FIG. 8) and then to selectively translate forward within the volume 44 for engagement by the plurality of retaining shelves 48 to operably retain the forward deck region 34 within the volume 44 (FIG. 9).

The deck 24 of vehicle 10' comprises a main body 50 and a cap 52 that is operably coupled to the main body 50 within the forward deck region 34. The cap 52 defines the plurality of protrusions 38 and the plurality of notches 40. In vehicle 10', the main body 50 and the cap 52 are constructed of different materials. In particular, the cap 52 is constructed of a more rigid and durable material than the main body 50 to permit for repeated translation into and within the volume 44 without undesirable degradation of the cap 52. Such a configuration maintains the integrity of the protrusions 38 and results in a desired longevity of the deck 24.

Figure 10:
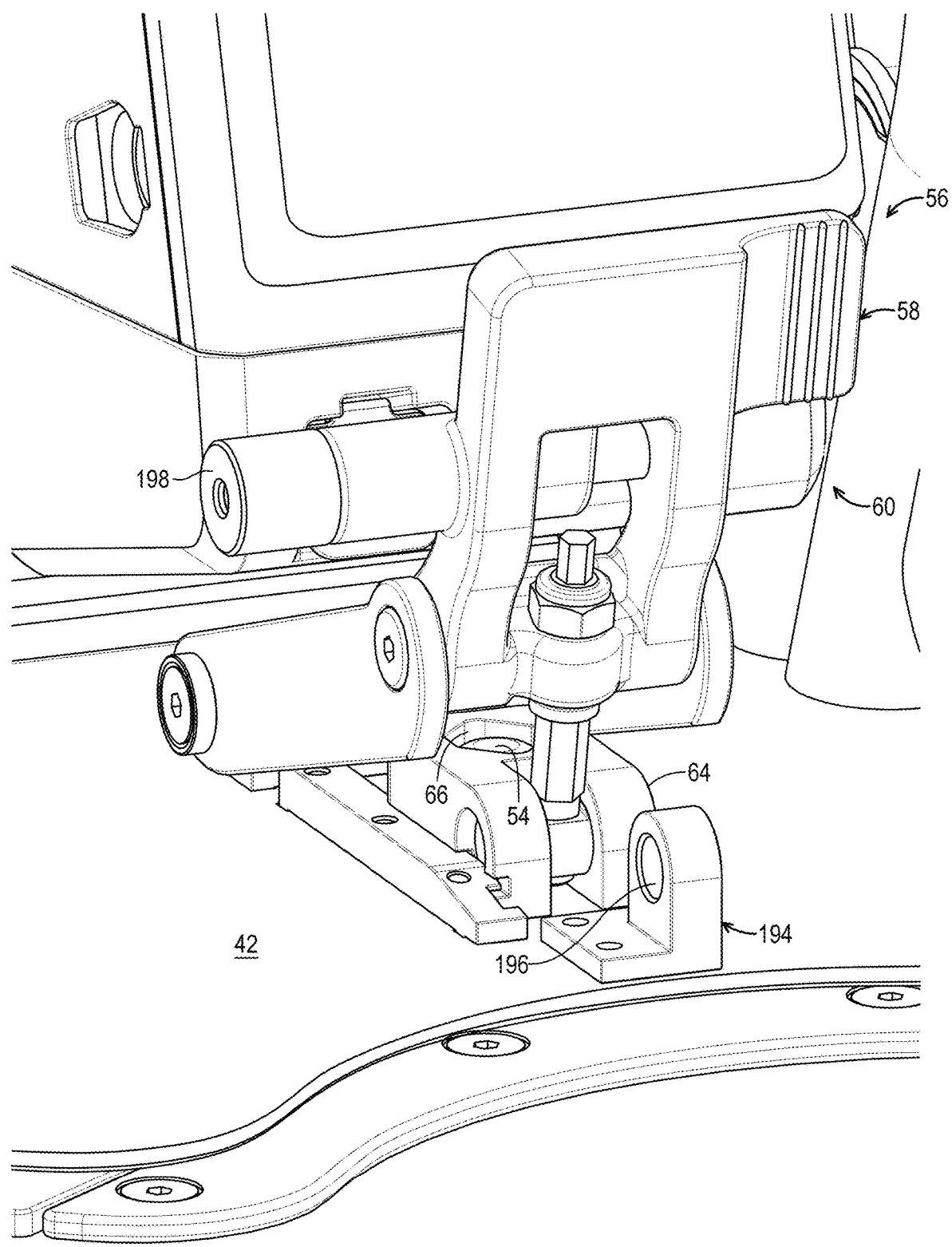
FIG. 10 is another detailed view of the vehicle of FIG. 4, showing the lever of the quick-disconnect assembly in an open position.
Figure 11:
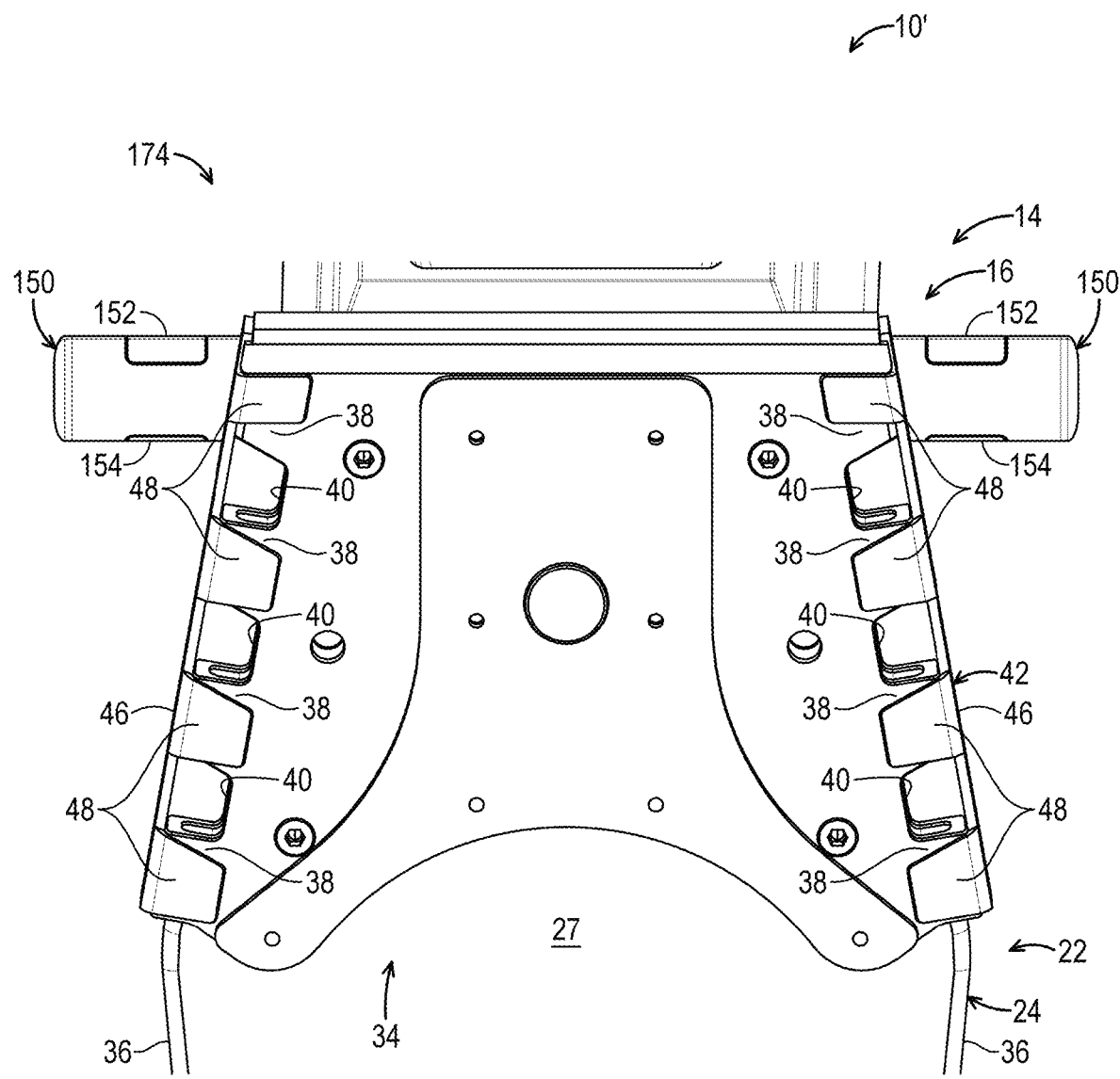
FIG. 11 is a detailed bottom view of the vehicle of FIG. 4, showing attachment of the rearward assembly to the forward assembly of the vehicle.

As seen in FIGS. 7 and 10, the deck 24 of vehicle 10' further comprises a post 54 that extends from the upper side 26 of the deck 24 within the forward deck region 34. The post 54 is configured to be selectively engaged by the forward assembly 14 when the forward deck region 34 is operatively received in the volume 44 and the plurality of retaining shelves 48 are operably engaged with the plurality of protrusions 38 to operably maintain the forward deck region 34 in the volume 44. The forward assembly 14 of vehicle 10' comprises a lever 58 that is positioned and configured to be engaged by a user. The lever 58 has an open position 60 (FIGS. 7, 8, and 10), in which the quick-disconnect assembly 56 permits the forward deck region 34 to be operably received and removed from the volume 44, and a closed position 62 (FIG. 9), in which the quick-disconnect assembly 56 restricts the forward deck region 34 from being removed from the volume 44 when the forward deck region 34 is operably received in the volume 44. The lever 58 is configured to be selectively locked in the closed position 62 to restrict transition to the open position 60.

As best seen in FIG. 10, the forward assembly 14 of vehicle 10' further comprises a post block 64 that is operably coupled to the lever 58. The post block 64 defines an aperture 66 that is configured to receive and engage with the post 54 when the forward deck region 34 is received in the volume 44. The post block 64 is configured to translate the post 54 when the lever 58 transitions between the open position 60 (FIG. 8) and the closed position 62 (FIG. 9), thereby translating the forward deck region 34 forward within the volume 44.

As also best seen in FIG. 10, the lever 58 of vehicle 10' is configured to be selectively locked in the closed position 62 (FIG. 9) to restrict transition to the open position 60 (FIG. 8). In particular, the quick-disconnect assembly 56 comprises a pin block 194 that is fixed relative to the deck-receiving bracket 42 and that defines a pin aperture 196. The lever 58 comprises a spring-biased pin 198 that is configured to selectively extend through the pin aperture 196 when the lever 58 is positioned in the closed position 62 (FIG. 9), thereby restricting the lever 58 from being pivoted away from the closed position 62 (FIG. 8).

As seen in FIGS. 7-9, the deck 24 may be operatively locked to the forward assembly 14.

Specifically, a lock passage 210 is defined through the deck-receiving bracket 42, and through which a padlock 212 (FIG. 9) may be operatively extended and locked. When present, the padlock 212 obstructs the right, forward-most protrusion 38 of the deck 24 to prevent the deck 24 from translating rearward to align the protrusions 38 between the retaining shelves 48 of the deck-receiving bracket 42.

Figure 12:
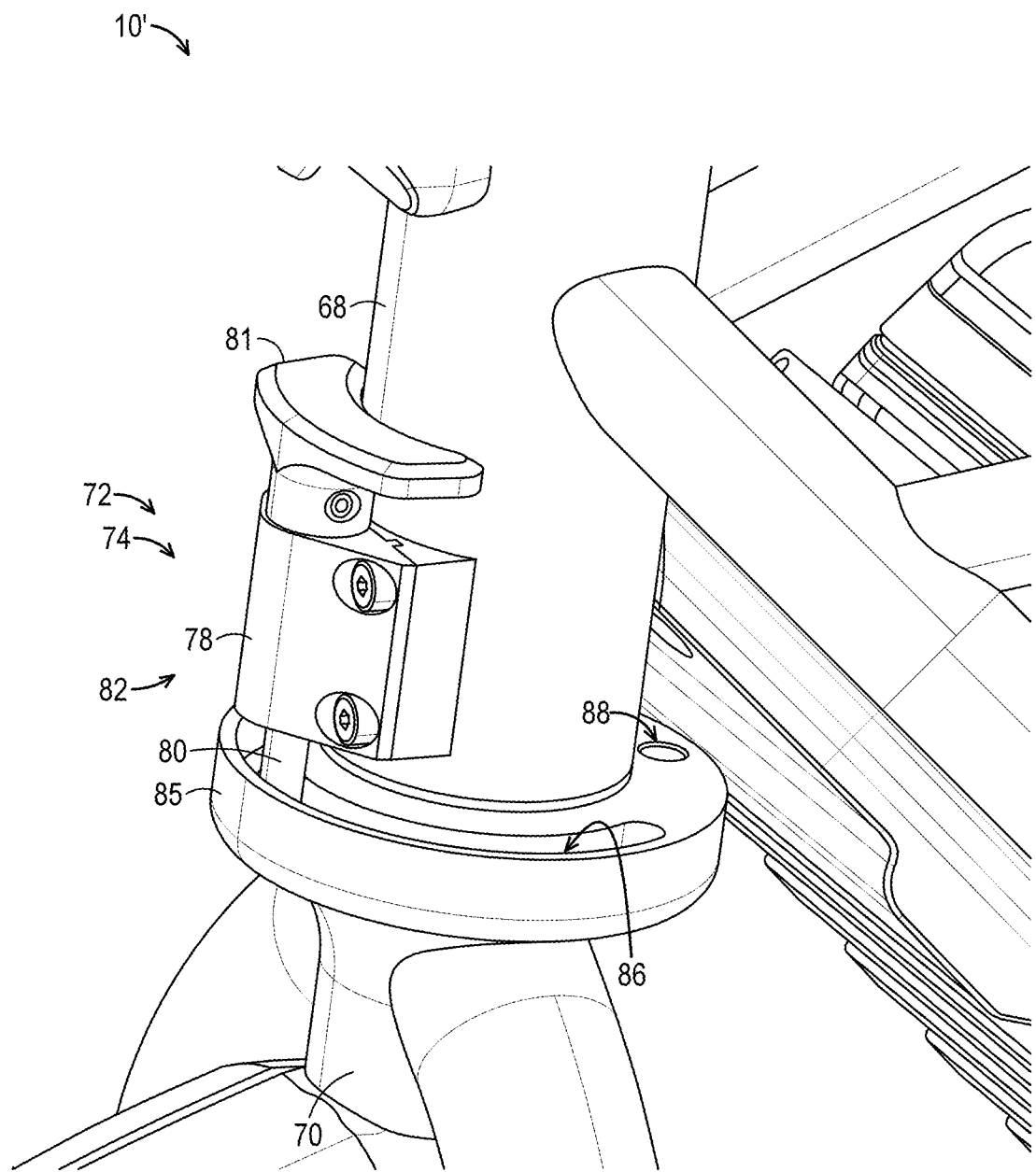
FIG. 12 is a detailed view of the vehicle of FIG. 4, showing the limiter in the first configuration.
Figure 13:
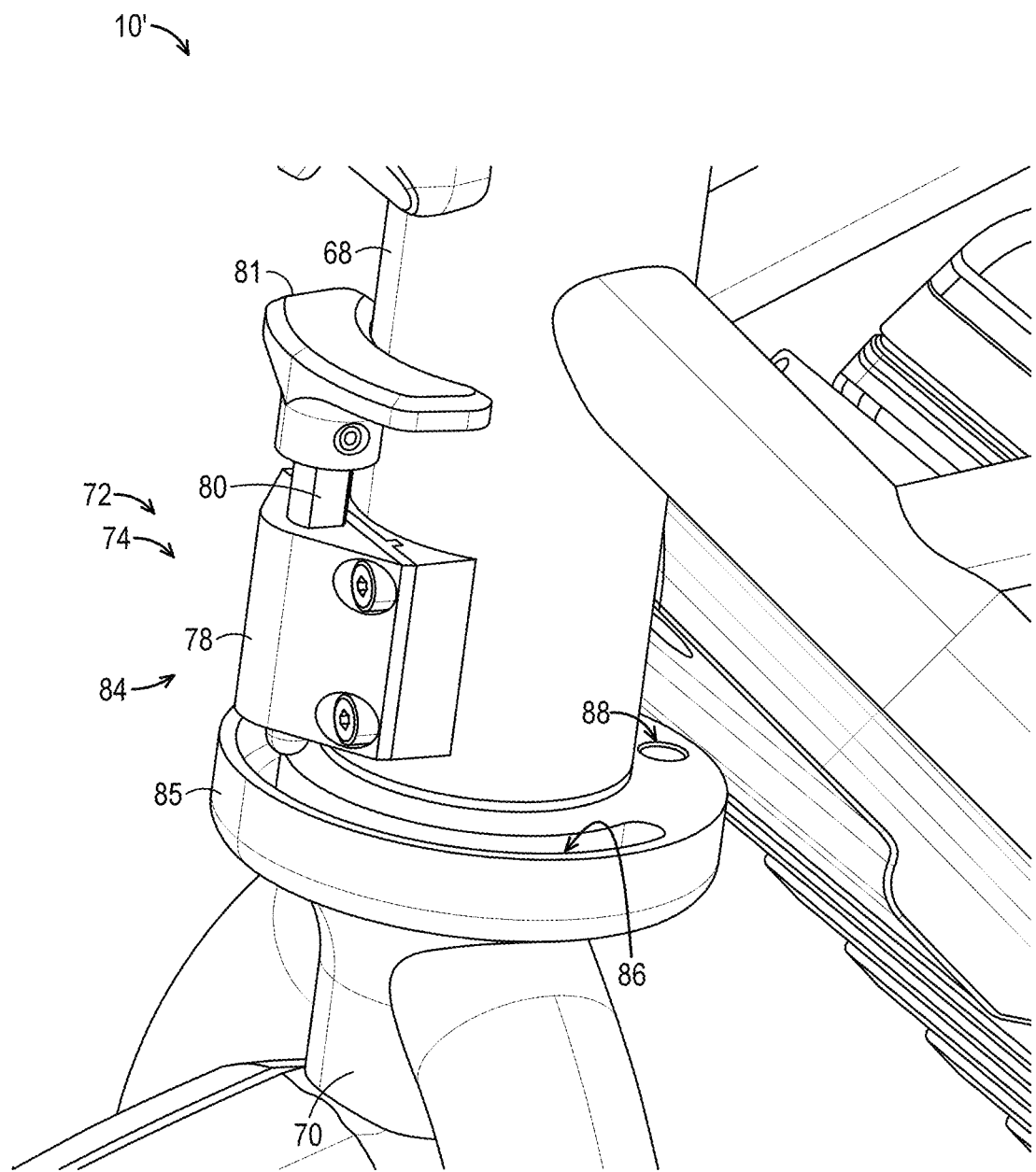
FIG. 13 is another detailed view of the vehicle of FIG. 4, showing the limiter with the limiter pin in the unlocked position.
Figure 14:
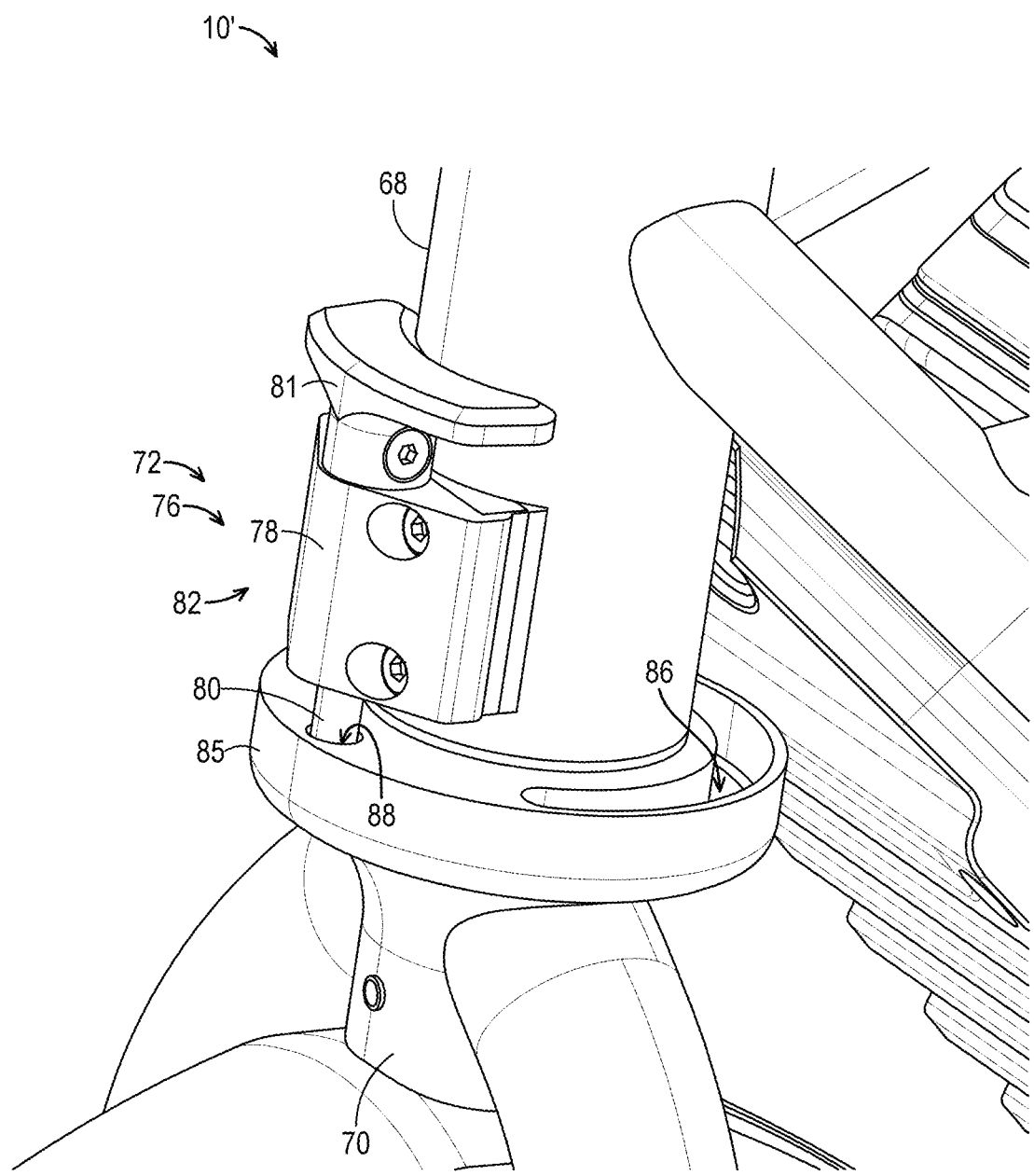
FIG. 14 is another detailed view of the vehicle of FIG. 4, showing the limiter in the second configuration.
Figure 15:
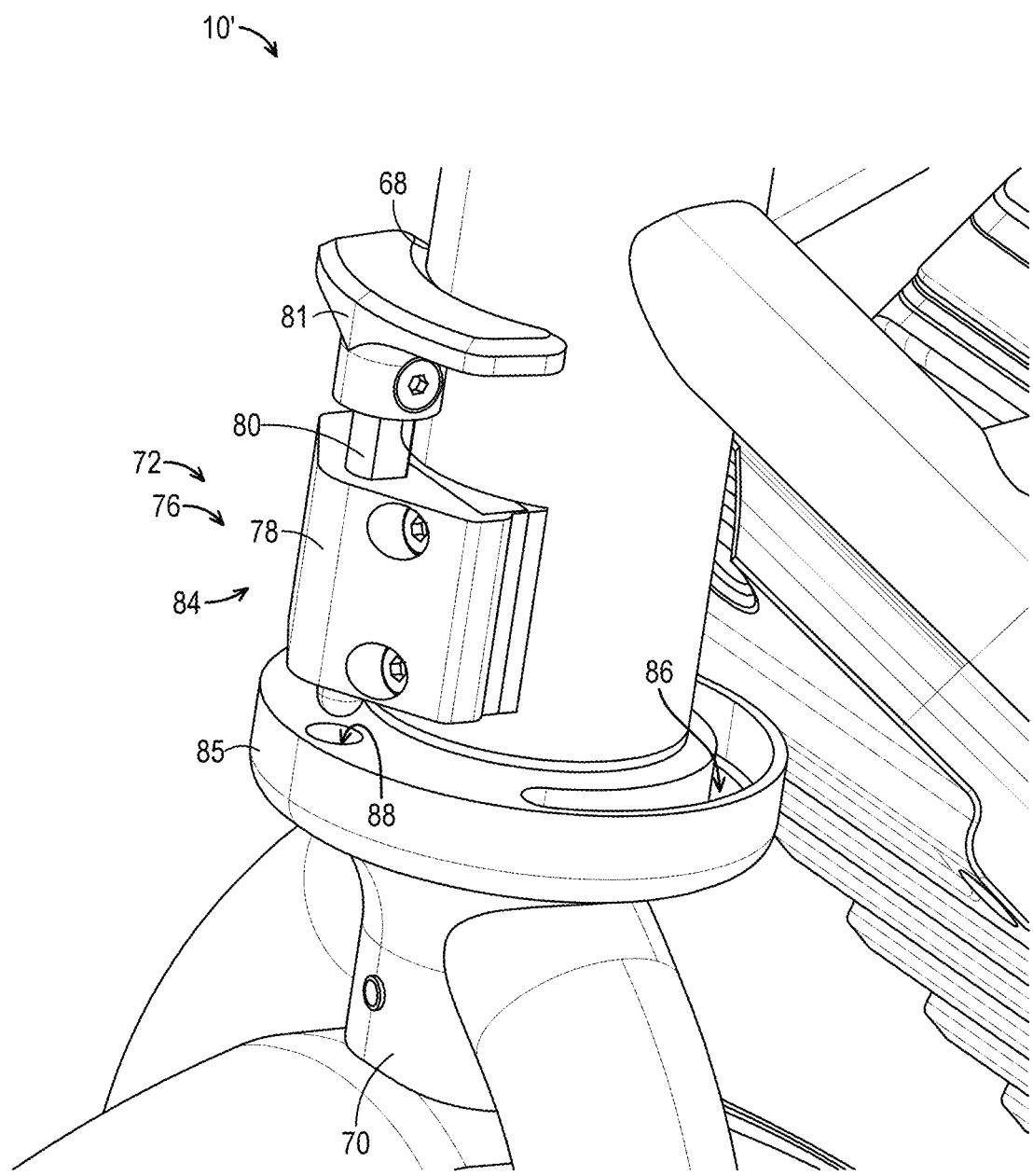
FIG. 15 is another detailed view of the vehicle of FIG. 4, showing the limiter with the limiter pin in the unlocked position.
Figure 16:
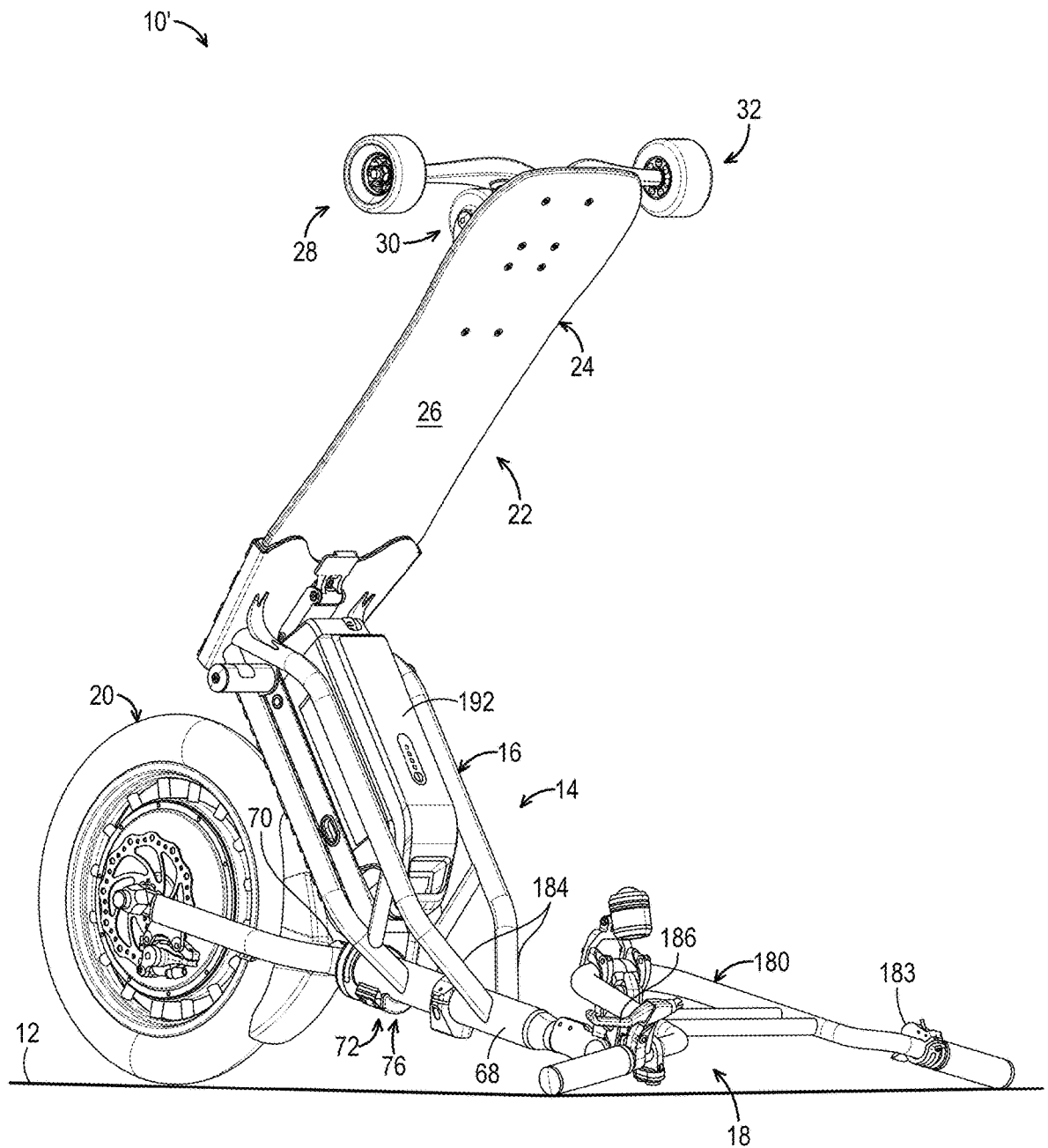
FIG. 16 is an angled view of the vehicle of FIG. 4, shown in an inverted, self-standing position.

Turning now to FIGS. 12-15, the limiter 72 of vehicle 10' has a first configuration 74 (FIG. 12), in which the steering tube 70 is limited to an angular range of rotation relative to the head tube 68, and a second configuration 76 (FIG. 14), in which the steering tube 70 is limited to no rotation relative to the head tube 68. The limiter 72 of vehicle 10' comprises a limiter block 78 that is fixed to the head tube 68, and a limiter pin 80 that extends through the limiter block 78 and that is configured to be selectively translated between a locked position 82 (FIGS. 12 and 14) and an unlocked position 84 (FIGS. 13 and 15). The limiter pin 80 comprises a handle 81 for engagement by a user and is spring-biased toward the locked position 82. The limiter 72 of vehicle 10' further comprises a circumferential flange 85 that extends around and is fixed relative to the steering tube 70. The circumferential flange 85 defines an arcuate channel 86 and a locking hole 88. Each of the arcuate channel 86 and the locking hole 88 are configured to be selectively aligned (via rotation of the steering tube 70) with the limiter pin 80 for receipt of the limiter pin 80 in the locked position 82 (FIGS. 12 and 14). The limiter 72 is in the first configuration 74 when the limiter pin 80 is received in the arcuate channel 86 (FIG. 12) and is in the second configuration 76 when the limiter pin 80 is received in the locking hole 88 (FIG. 14). As seen in FIG. 16, when the limiter 72 is in the second configuration 76, the vehicle 10' may be placed in an inverted, self-standing position on a ground surface 12.

Figure 17:
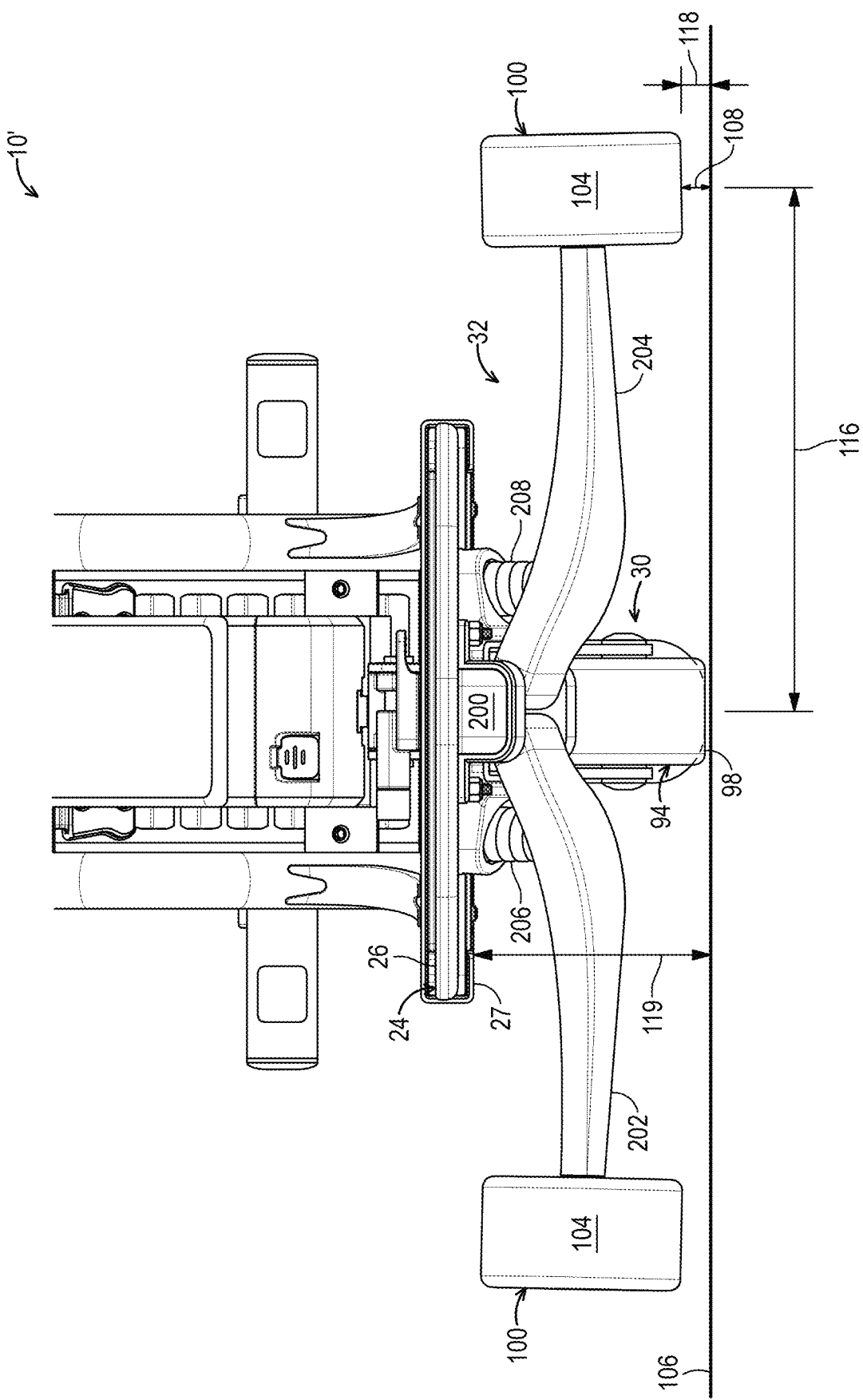
FIG. 17 is a detailed rear view of the vehicle of FIG. 4.

With reference now to FIG. 17, vehicle 10' is depicted with (i) the front-wheel axis 90 and the caster-wheel axis 96 parallel to a planar ground surface 106, (ii) the front-wheel ground-contacting surface 92 and the caster-wheel ground-contacting surface 98 engaged with the planar ground surface 106, (iii) and the truck assembly 32 in the neutral configuration. In vehicle 10', the truck-wheel angle 108 is about 1.2°, the truck-wheel track 116 is about 236 mm, the truck-wheel height 118 is about 10.7 mm, and the deck height 119 is about 111 mm.

The truck assembly 32 of vehicle 10' is an example of a truck assembly 32 having an independent suspension configuration. Specifically, the truck assembly 32 of vehicle 10' comprises a pivot block 200 mounted to the lower side 27 of the deck 24, a left axle 202 pivotally coupled to the pivot block 200 and operatively supporting the left truck wheel 100, a right axle 204 pivotally coupled to the pivot block 200 and operatively supporting the right truck wheel 100, a left spring 206 operatively positioned between the left axle 202 and the lower side 27 of the deck 24, and a right spring 208 operatively positioned between the right axle 204 and the lower side 27 of the deck 24. The left spring 206 and the right spring 208 bias the left axle 202 and the right axle 204, respectively, away from the lower side 27 of the deck 24.

Figure 18:
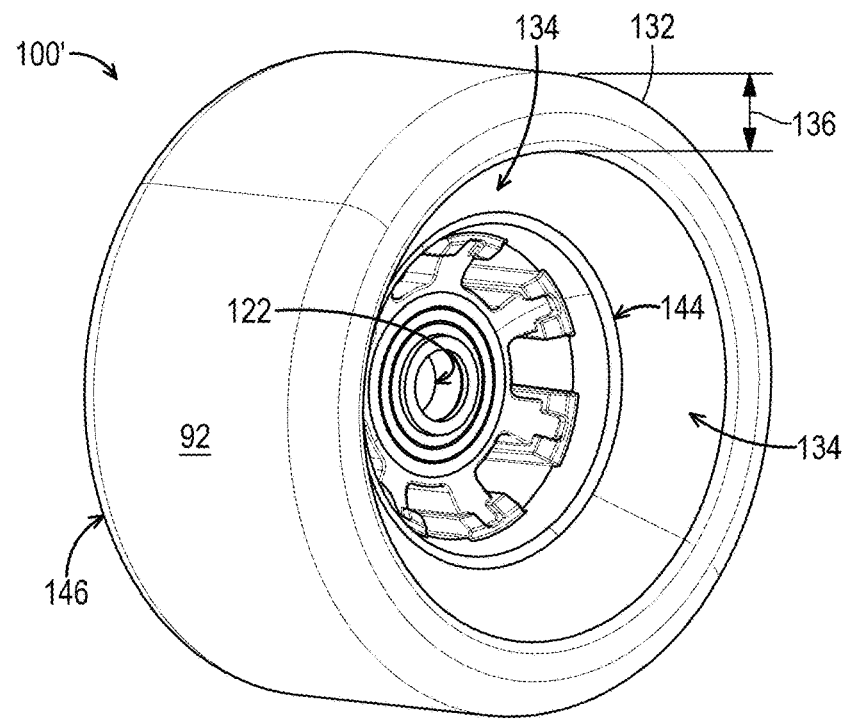
FIG. 18 is an angled lateral view of a truck wheel according to the present disclosure.
Figure 19:
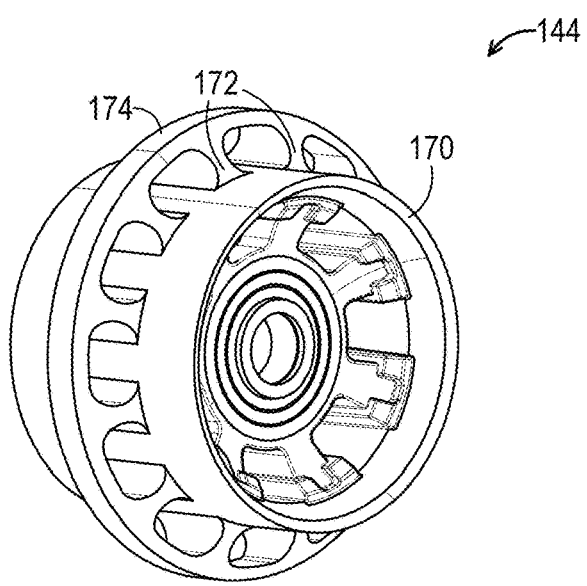
FIG. 19 is an angled lateral view of the core of the truck wheel of FIG. 18.
Figure 20:
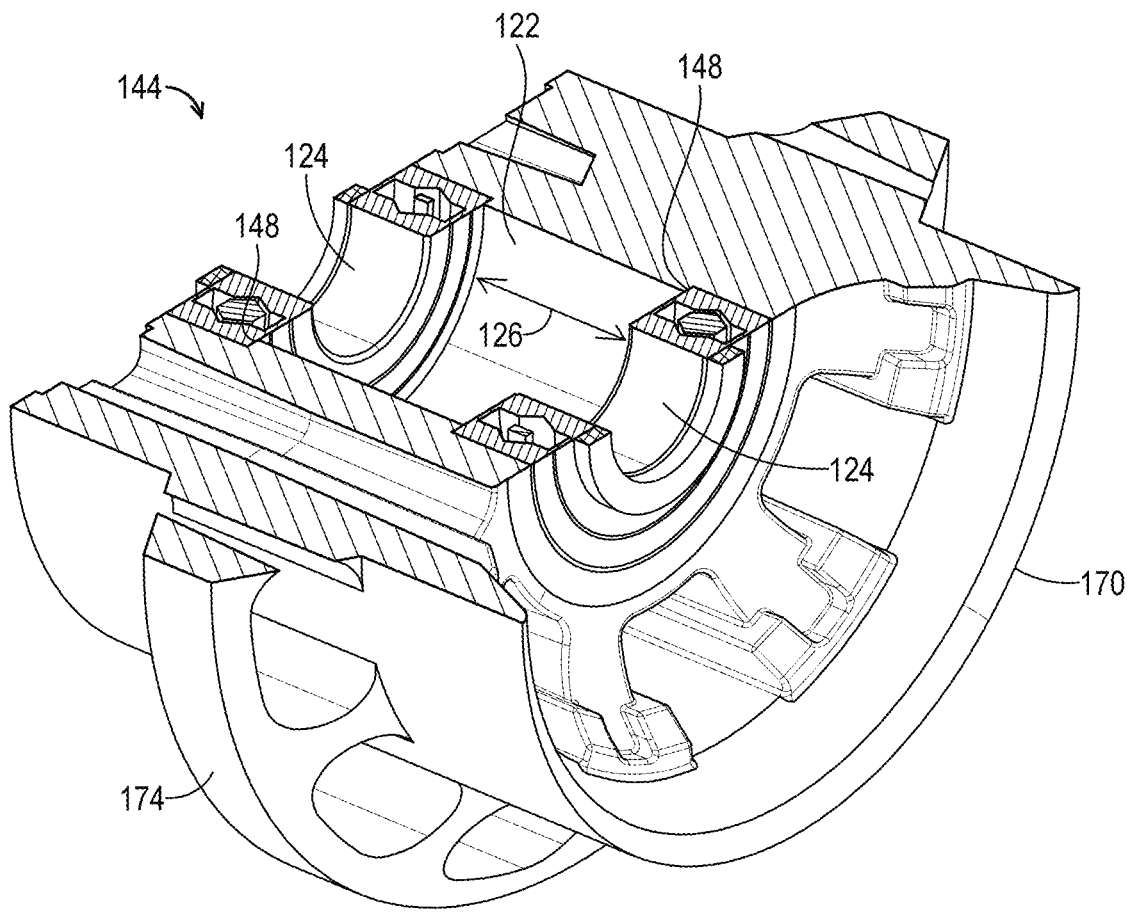
FIG. 20 is an angled lateral cross-sectional view of the core of the truck wheel of FIG. 18.

Truck wheel 100' of FIGS. 18-20 is an example of a truck wheel 100 whose body 120 comprises a core 144 constructed of a plastic and a tire 146 constructed of a polyurethane that is molded over the core 144. The tire 146 of wheel 100' has a lateral sidewall 132 and a frustoconical recess 134 that extends from the lateral sidewall 132 toward the axle bore 122 of the wheel 100'. In wheel 100', the sidewall depth 136 is about 9 mm, the radius of curvature 138 is about 5 mm, the radius of curvature 142 is about 5 mm, and the bearing spacing 126 is about 15 mm.

As seen in FIGS. 19 and 20, the core 144 comprises a cylindrical body 170, a plurality of outer splines 172 extending radially outward from the cylindrical body 170, and an annular ring 174 extending around and connecting the outer splines 172. The outer splines 172 and the annular ring 174 provide structure for secure over-molding of the tire 146 to the core 144.

Illustrative, non-exclusive examples of inventive subject matter according to the present disclosure are described in the following enumerated paragraphs:

A. A vehicle (10) for riding along a ground surface (12), comprising:
 a forward assembly (14) comprising:
  a front frame assembly (16);
  a steering assembly (18) pivotally supported by the front frame assembly (16); and
  a front wheel (20) operably coupled to the steering assembly (18) and positioned to engage the ground surface (12); and
 a rearward assembly (22) coupled to and extending rearward from the forward assembly (14), wherein the rearward assembly (22) comprises:
  a deck (24) having an upper side (26) for supporting a rider in a standing position, and a lower side (27) opposite the upper side (26); and
  a rear wheel assembly (28) operably coupled to the deck (24) and positioned to engage the ground surface (12) when the front wheel (20) engages the ground surface (12).

A1. The vehicle (10) of paragraph A, wherein the rear wheel assembly (28) comprises:
- a caster assembly (30) operably coupled to the deck (24) opposite the upper side (26); and
- a truck assembly (32) operably coupled to the deck (24) opposite the upper side (26) and rearward of the caster assembly (30).

A2. The vehicle (10) of any of paragraphs A-A2, wherein the rearward assembly (22) is configured to be selectively detached from and reattached to the forward assembly (14).

A2.1. The vehicle (10) of paragraph A2,
- wherein the deck (24) has a forward deck region (34) and lateral sides (36), wherein the deck (24) comprises a plurality of protrusions (38) extending from the lateral sides (36) within the forward deck region (34) and a plurality of notches (40) extending into the lateral sides (36) within the forward deck region (34) between adjacent pairs of the plurality of protrusions (38);
- wherein the forward assembly (14) comprises a deck-receiving bracket (42) operably supported by the front frame assembly (16) and that defines a volume (44) configured to selectively receive the forward deck region (34), wherein the deck-receiving bracket (42) comprises lateral sidewalls (46) and a plurality of retaining shelves (48) extending medially from the lateral sidewalls (46); and
- wherein the plurality of protrusions (38) are sized to selectively pass between the plurality of retaining shelves (48) for receipt of the forward deck region (34) into the volume (44) and to selectively translate within the volume (44) for engagement by the plurality of retaining shelves (48) to operably retain the forward deck region (34) within the volume (44).

A2.1.1. The vehicle (10) of paragraph A2.1, wherein the deck (24) comprises:
- a main body (50); and
- a cap (52) operably coupled to the main body (50) within the forward deck region (34), wherein the cap (52) defines the plurality of protrusions (38) and the plurality of notches (40).

A2.1.1.1. The vehicle (10) of paragraph A2.1.1, wherein the main body (50) and the cap (52) are constructed of different materials.

A2.1.1.2. The vehicle (10) of any of paragraphs A2.1.1-A2.1.1.1, wherein the cap (52) is constructed of a more rigid material than the main body (50).

A2.1.1.3. The vehicle (10) of any of paragraphs A2.1.1-A2.1.1.2,
- wherein the deck (24) further comprises a post (54) extending from the upper side (26) of the deck (24) within the forward deck region (34); and
- wherein the post (54) is configured to be selectively engaged by the forward assembly (14) when the forward deck region (34) is operatively received in the volume (44) and the plurality of retaining shelves (48) are operably engaged with the plurality of protrusions (38) to operably maintain the forward deck region (34) in the volume (44).

A2.2. The vehicle (10) of any of paragraphs A2-A2.1.1.3, wherein the forward assembly (14) and the rearward assembly (22) collectively define a quick-disconnect assembly (56) configured to selectively release and secure the rearward assembly (22) from and to the forward assembly (14).

A2.2.1. The vehicle (10) of paragraph A2.2, wherein the forward assembly (14) comprises a lever (58) positioned and configured to be engaged by a user, wherein the lever (58) has an open position (60), in which the quick-disconnect assembly (56) permits the forward deck region (34) to be operably received and removed from the volume (44), and a closed position (62), in which the quick-disconnect assembly (56) restricts the forward deck region (34) from being removed from the volume (44) when the forward deck region (34) is operably received in the volume (44).

A2.2.1.1. The vehicle (10) of paragraph A2.2.1, wherein the lever (58) is configured to be selectively locked in the closed position (62) to restrict transition to the open position (60).

A2.2.1.2. The vehicle (10) of any of paragraphs A2.2.1-A2.2.1.1 when depending from paragraph A2.1.1.3, wherein the forward assembly (14) further comprises a post block (64) operably coupled to the lever (58), wherein the post block (64) defines an aperture (66) configured to receive and engage with the post (54) when the forward deck region (34) is received in the volume (44), and wherein the post block (64) is configured to translate the post (54) when the lever (58) transitions between the open position (60) and the closed position (62).

A3. The vehicle (10) of any of paragraphs A-A2.2.1.2,
- wherein the front frame assembly (16) comprises a head tube (68);
- wherein the steering assembly (18) comprises a steering tube (70) rotatably extending through the head tube (68) and operably coupled to the front wheel (20); and
- wherein the forward assembly (14) comprises a limiter (72) configured to selectively limit rotation of the steering tube (70) relative to the head tube (68).

A3.1. The vehicle (10) of paragraph A3, wherein the limiter (72) has a first configuration (74), in which the steering tube (70) is limited to an angular range of rotation relative to the head tube (68), and a second configuration (76), in which the steering tube (70) is limited to no rotation relative to the head tube (68).

A3.1.1. The vehicle (10) of paragraph A3.1, wherein the limiter (72) comprises:
- a limiter block (78) fixed to the head tube (68);
- a limiter pin (80) extending through the limiter block (78) and configured to be selectively translating between a locked positioned (82) and an unlocked position (84), wherein the limiter pin (80) is spring-biased toward the locked position (82); and
- a circumferential flange (85) extending around and fixed relative to the steering tube (70), wherein the circumferential flange (85) defines an arcuate channel (86) and a locking hole (88), wherein each of the arcuate channel (86) and the locking hole (88) are configured to be selectively aligned with the limiter pin (80) for receipt of the limiter pin (80) in the locked position (82), and wherein the limiter (72) is in the first configuration (74) when the limiter pin (80) is received in the arcuate channel (86) and is in the second configuration (76) when the limiter pin (80) is received in the locking hole (88).

A4. The vehicle (10) of any of paragraphs A-A3.1.1,
- wherein the front wheel (20) has a front-wheel axis (90) and a front-wheel ground-contacting surface (92);
- wherein the rear wheel assembly (28) comprises:
  - a/the caster assembly (30) operably coupled to the deck (24) opposite the upper side (26), wherein the caster assembly (30) comprises a caster wheel (94) having a caster-wheel axis (96) and a caster-wheel ground-contacting surface (98); and
  - a/the truck assembly (32) operably coupled to the deck (24) opposite the upper side (26) and rearward of the caster assembly (30), wherein the truck assembly

(32) comprises a pair of truck wheels (100), wherein each truck wheel (100) has a truck-wheel axis (102) and a truck-wheel ground-contacting surface (104), and wherein each truck wheel (100) has a truck-wheel center plane (112) that bisects the truck-wheel ground-contacting surface (104); and wherein when (i) the front-wheel axis (90) and the caster-wheel axis (96) are parallel to a planar ground surface (106), (ii) the front-wheel ground-contacting surface (92) and the caster-wheel ground-contacting surface (98) are engaged with the planar ground surface (106), and (iii) the truck assembly (32) is in a neutral configuration:

the truck-wheel ground-contacting surface (104) and/or the truck-wheel axis (102) of each truck wheel (100) is at a truck-wheel angle (108) relative to the planar ground surface (106);

the vehicle (10) has a vehicle center plane (110) that bisects the vehicle (10) and that is perpendicular to the planar ground surface (106);

a closest distance from an intersection (114) of the truck-wheel center plane (112) and the truck-wheel ground-contacting surface (104) closest to the planar ground surface (106) to the vehicle center plane (110) is a truck-wheel track (116);

a closest distance from the intersection (114) to the planar ground surface (106) is a truck-wheel height (118); and a closest distance from the lower side (27) of the deck (24) to the planar ground surface (106) is a deck height (119).

A4.1. The vehicle (10) of paragraph A4, wherein the truck-wheel ground-contacting surface (104) is cylindrical.

A4.2. The vehicle (10) of any of paragraphs A4-A4.1, wherein the truck-wheel angle (108) is non-zero.

A4.3. The vehicle (10) of any of paragraphs A4-A4.2, wherein the truck-wheel angle (108) is 1-5 degrees (°), 1-3°, 1-2°, or about 1.2°.

A4.4. The vehicle (10) of any of paragraphs A4-A4.3, wherein the truck-wheel track (116) is 150-500 millimeters (mm), 150-400 mm, 150-300 mm, 150-250 mm, 200-500 mm, 200-400 mm, 200-300 mm, 200-250 mm, or about 236 mm.

A4.5. The vehicle (10) of any of paragraphs A4-A4.4, wherein the truck-wheel height (118) is 5-80 mm, 5-60 mm, 5-40 mm, 5-30 mm, 5-20 mm, 5-10 mm, 10-50 mm, 10-40 mm, 10-30 mm, 10-20 mm, 10-15 mm, or about 22 mm.

A4.6. The vehicle (10) of any of paragraphs A4-A4.5, wherein a ratio of the truck-wheel track (116) to the truck-wheel height (118) is 15-30, 15-25, 15-20, 20-30, 20-25, or about 22.

A4.7. The vehicle (10) of any of paragraphs A4-A4.6, wherein the deck height (119) is 70-200 mm, 70-150 mm, 70-120 mm, 90-200 mm, 90-150 mm, 90-120 mm, or about 111 mm.

A4.8. The vehicle (10) of any of paragraphs A4-A4.8, wherein a ratio of the truck-wheel track (116) to the deck height (119) is 0.5-5, 0.5-4, 0.5-3, 1-5, 1-4, 1-3, 2-5, 2-4, 2-3, or about 2.1.

A4.9. The vehicle (10) of any of paragraphs A4-A4.8, wherein a ratio of the deck height (119) to the truck-wheel height (118) is 5-20, 5-15, 5-12, 10-20, 10-15, 10-12, or about 10.4.

A5. The vehicle (10) of any of paragraphs A-A4.9, wherein the rear wheel assembly (28) comprises a/the truck assembly (32) operably coupled to the deck (24) opposite the upper side (26); and wherein the truck assembly (32) comprises truck wheels (100); and wherein each truck wheel (100) comprises:
a body (120) that defines an axle bore (122); and
a pair of roller bearings (124) operatively received within the axle bore (122);

wherein the pair of roller bearings (124) are spaced apart by a bearing spacing (126); and wherein each truck wheel (100) has a truck-wheel diameter (128) and a truck-wheel width (130).

A5.1. The vehicle (10) of paragraph A5, wherein the bearing spacing (126) is at least 12 mm.

A5.2. The vehicle (10) of paragraph A5, wherein the bearing spacing (126) is 11-25 mm, 12-25 mm, 13-25 mm, 14-25 mm, 11-20 mm, 12-20 mm, 13-20 mm, 14-20 mm, about 14 mm, about 15 mm, or about 16 mm.

A5.3. The vehicle (10) of any of paragraphs A5-A5.2, wherein a ratio of the truck-wheel diameter (128) to the bearing spacing (126) is 4-10, 5-10, 6-10, 4-9, 4-8, 4-7, 5-7, or about 6.

A5.4. The vehicle (10) of any of paragraphs A5-A5.3, wherein a ratio of the truck-wheel width (130) to the bearing spacing (126) is 1-5, 2-5, 3-5, 3-4, or about 3⅓.

A5.5. The vehicle (10) of any of paragraphs A5-A5.4, wherein a ratio of the truck-wheel diameter (128) to the truck-wheel width (130) is 1-2.5, 1.2-2.5, 1.4-2.5, 1-2, 1.2-2, 1.4-2, 1.6-2, or about 1.8.

A5.6. The vehicle (10) of any of paragraphs A5-A5.5, wherein the body (120) has a lateral sidewall (132) and a recess (134) extending from the lateral sidewall (132) toward the axle bore (122); and wherein the lateral sidewall (132) has a sidewall depth (136) from a/the truck-wheel ground-contacting surface (104) to the recess (134).

A5.6.1. The vehicle (10) of paragraph A5.6, wherein the recess (134) is frustoconical.

A5.6.2. The vehicle (10) of any of paragraphs A5.6-A5.6.1, wherein the sidewall depth (136) is 5-15 mm, 7-15 mm, 5-12 mm, 7-12 mm, 7-10 mm, about 10 mm, or about 9 mm.

A5.6.3. The vehicle (10) of any of paragraphs A5.6-A5.6.2, wherein a ratio of the truck-wheel diameter (128) to the sidewall depth (136) is 5-15, 7-15, 9-15, 5-12, 7-12, 9-12, or about 10.

A5.6.4. The vehicle (10) of any of paragraphs A5.6-A5.6.3, wherein a ratio of the truck-wheel width (130) to the sidewall depth (136) is 3-9, 3-7, 5-7, 5-6, or about 5.5.

A5.6.5. The vehicle (10) of any of paragraphs A5.6-A5.6.4, wherein a transition between the truck-wheel ground-contacting surface (104) to the lateral sidewall (132) has a radius of curvature (138) of 2-10 mm, 2-8 mm, 2-6 mm, 4-10 mm, 4-8 mm, 4-6 mm, or about 5 mm.

A5.6.6. The vehicle (10) of any of paragraphs A5.6-A5.6.5,
wherein the body (120) has a medial sidewall (140) opposite the lateral sidewall (132); and
wherein a transition between the truck-wheel ground-contacting surface (104) to the medial sidewall (140) has a radius of curvature (142) of 2-10 mm, 2-8 mm, 2-6 mm, 4-10 mm, 4-8 mm, 4-6 mm, or about 5 mm.

A5.7. The vehicle (10) of any of paragraphs A5-A5.6.6, wherein the body (120) comprises:
a core (144) that defines the axle bore (122); and
a tire (146) operatively coupled to the core (144) and that defines a/the truck-wheel ground-contacting surface (104).

A5.7.1. The vehicle (10) of paragraph A5.7, wherein the core (144) and the tire (146) are constructed of different materials.

A6 The vehicle (10) of any of paragraphs A-A5.7.1, wherein the forward assembly (14) further comprises a pair of opposing frame sliders (150) operably supported by and extending laterally from the front frame assembly (16).

A6.1. The vehicle (10) of paragraph A6, wherein each frame slider (150) comprises one or more of:
a forward-facing light (152); and/or
a rearward-facing light (154); and/or
a lateral-facing light (156).

A6.2. The vehicle (10) of any of paragraphs A6-A6.1, wherein each frame slider (150) is generally cylindrical.

A6.3. The vehicle (10) of any of paragraphs A6-A6.2, wherein each frame slider (150) is 30-100 mm long.

A6.4. The vehicle (10) of any of paragraphs A6-A6.3, wherein each frame slider (150) is positioned within 100 mm, 200 mm, or 300 mm of the deck (24) and/or within 100 mm, 200 mm, 300 mm, or 400 mm of the ground surface (12).

A7. The vehicle (10) of any of paragraphs A-A6.4, wherein the front wheel (20) is powered.

A7.1. The vehicle (10) of paragraph A7, wherein forward assembly (14) further comprises a hub motor (158) operably coupled to the steering assembly (18), and wherein the front wheel (20) if operably coupled to the hub motor (158).

A8. The vehicle (10) of any of paragraphs A-A7.1, wherein the forward assembly (14) comprises one or more drift sensors (160) configured to measure a drift position of the vehicle (10).

B. A deck (24) for a vehicle (10), the deck (24) comprising:
a forward deck region (34);
lateral sides (36);
a plurality of protrusions (38) extending from the lateral sides (36) within the forward deck region (34); and
a plurality of notches (40) extending into the lateral sides (36) within the forward deck region (34) between adjacent pairs of the plurality of protrusions (38).

B1. The deck (24) of paragraph B, further comprising:
a main body (50); and
a cap (52) operably coupled to the main body (50) within the forward deck region (34), wherein the cap (52) defines the plurality of protrusions (38) and the plurality of notches (40).

B1.1. The deck (24) of paragraph B1, wherein the main body (50) and the cap (52) are constructed of different materials.

B1.2. The deck (24) of any of paragraphs B1-B1.1, wherein the cap (52) Is constructed of a more rigid material than the main body (50).

B2. The deck (24) of any of paragraphs B-B1.4, further comprising a post (54) extending from an upper side (26) of the deck (24) within the forward deck region (34).

B3. A rearward assembly (22), comprising:
the deck (24) of any of paragraphs B-B2; and
a rear wheel assembly (28) operably coupled to the deck (24).

B3.1. The rearward assembly (22) of paragraph B3, wherein the rear wheel assembly (28) comprises:
a caster assembly (30) operably coupled to the deck (24); and
a truck assembly (32) operably coupled to the deck (24) rearward of the caster assembly (30).

C. A truck wheel (100) for a truck assembly (32) of a vehicle (10), the truck wheel (100) comprising:

a body (120) that defines an axle bore (122) that defines opposing shelves (148) for operative engagement of a pair of roller bearings (124) within the axle bore (122);
wherein the opposing shelves (148) are spaced apart by a bearing spacing (126); and
wherein each truck wheel (100) has a truck-wheel diameter (128) and a truck-wheel width (130).

C1. The truck wheel (100) of paragraph C, wherein the bearing spacing (126) is at least 12 mm.

C2. The truck wheel (100) of paragraph C, wherein the bearing spacing (126) is 11-25 mm, 12-25 mm, 13-25 mm, 14-25 mm, 11-20 mm, 12-20 mm, 13-20 mm, 14-20 mm, about 14 mm, about 15 mm, or about 16 mm.

C3. The truck wheel (100) of any of paragraphs C-C2, wherein a ratio of the truck-wheel diameter (128) to the bearing spacing (126) is 4-10, 5-10, 6-10, 4-9, 4-8, 4-7, 5-7, or about 6.

C4. The truck wheel (100) of any of paragraphs C-C3, wherein a ratio of the truck-wheel width (130) to the bearing spacing (126) is 1-5, 2-5, 3-5, 3-4, or about 3⅓.

C5. The truck wheel (100) of any of paragraphs C-C4, wherein a ratio of the truck-wheel diameter (128) to the truck-wheel width (130) is 1-2.5, 1.2-2.5, 1.4-2.5, 1-2, 1.2-2, 1.4-2, 1.6-2, or about 1.8.

C6. The truck wheel (100) of any of paragraphs C-C5,
wherein the body (120) has a lateral sidewall (132) and a recess (134) extending from the lateral sidewall (132) toward the axle bore (122);
wherein the truck wheel (100) has a truck-wheel ground-contacting surface (104); and
wherein the lateral sidewall (132) has a sidewall depth (136) from the truck-wheel ground-contacting surface (104) to the recess (134).

C6.1. The truck wheel (100) of paragraph C6, wherein the recess (134) is frustoconical.

C6.2. The truck wheel (100) of any of paragraphs C6-C6.1, wherein the sidewall depth (136) is 5-15 mm, 7-15 mm, 5-12 mm, 7-12 mm, 7-10 mm, about 10 mm, or about 9 mm.

C6.3. The truck wheel (100) of any of paragraphs C6-C6.2, wherein a ratio of the truck-wheel diameter (128) to the sidewall depth (136) is 5-15, 7-15, 9-15, 5-12, 7-12, 9-12, or about 10.

C6.4. The truck wheel (100) of any of paragraphs C6-C6.3, wherein a ratio of the truck-wheel width (130) to the sidewall depth (136) is 3-9, 3-7, 5-7, 5-6, or about 5.5.

C6.5. The truck wheel (100) of any of paragraphs C6-C6.4, wherein a transition between the truck-wheel ground-contacting surface (104) to the lateral sidewall (132) has a radius of curvature (138) of 2-10 mm, 2-8 mm, 2-6 mm, 4-10 mm, 4-8 mm, 4-6 mm, or about 5 mm.

C6.6. The truck wheel (100) of any of paragraphs C6-C6.5,
wherein the body (120) has a medial sidewall (140) opposite the lateral sidewall (132); and
wherein a transition between the truck-wheel ground-contacting surface (104) to the medial sidewall (140) has a radius of curvature (142) of 2-10 mm, 2-8 mm, 2-6 mm, 4-10 mm, 4-8 mm, 4-6 mm, or about 5 mm.

C7. The truck wheel (100) of any of paragraphs C-C6.6, wherein the body (120) comprises:
a core (144) that defines the axle bore (122); and
a tire (146) operatively coupled to the core (144) and that defines a/the truck-wheel ground-contacting surface (104).

C7.1. The truck wheel (100) of paragraph C7, wherein the core (144) and the tire (146) are constructed of different materials.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A vehicle (10) for riding along a ground surface (12), comprising:
   a forward assembly (14) comprising:
      a front frame assembly (16) comprising a head tube (68);
      a steering assembly (18) pivotally supported by the front frame assembly (16) and comprising a steering tube (70) rotatably extending through the head tube (68);
      a front wheel (20) operably coupled to the steering tube (70) and positioned to engage the ground surface (12); and
      a limiter (72) configured to selectively limit rotation of the steering tube (70) relative to the head tube (68), wherein the limiter (72) has a first configuration (74), in which the steering tube (70) is limited to an angular range of rotation relative to the head tube (68), and a second configuration (76), in which the steering tube (70) is limited to no rotation relative to the head tube (68), and wherein the limiter (72) comprises:
         a limiter block (78) fixed to the head tube (68);
         a limiter pin (80) extending through the limiter block (78) and configured to be selectively translated between a locked positioned (82) and an unlocked position (84), wherein the limiter pin (80) is spring-biased toward the locked position (82); and
         a circumferential flange (85) extending around and fixed relative to the steering tube (70), wherein the circumferential flange (85) defines an arcuate channel (86) and a locking hole (88), wherein each of the arcuate channel (86) and the locking hole (88) are configured to be selectively aligned with the limiter pin (80) for receipt of the limiter pin (80) in the locked position (82), and wherein the limiter (72) is in the first configuration (74) when the limiter pin (80) is received in the arcuate channel (86) and is in the second configuration (76) when the limiter pin (80) is received in the locking hole (88); and
   a rearward assembly (22) coupled to and extending rearward from the forward assembly (14), wherein the rearward assembly (22) comprises:
      a deck (24) having an upper side (26) for supporting a rider in a standing position, and a lower side (27) opposite the upper side (26); and
      a rear wheel assembly (28) operably coupled to the deck (24) and positioned to engage the ground surface (12) when the front wheel (20) engages the ground surface (12).

2. The vehicle (10) of claim 1, wherein the rearward assembly (22) is configured to be selectively detached from and reattached to the forward assembly (14).

3. The vehicle (10) of claim 2,
   wherein the deck (24) has a forward deck region (34) and lateral sides (36), wherein the deck (24) comprises a plurality of protrusions (38) extending from the lateral sides (36) within the forward deck region (34) and a plurality of notches (40) extending into the lateral sides (36) within the forward deck region (34) between adjacent pairs of the plurality of protrusions (38);
   wherein the forward assembly (14) comprises a deck-receiving bracket (42) operably supported by the front frame assembly (16) and that defines a volume (44) configured to selectively receive the forward deck region (34), wherein the deck-receiving bracket (42) comprises lateral sidewalls (46) and a plurality of retaining shelves (48) extending medially from the lateral sidewalls (46); and
   wherein the plurality of protrusions (38) are sized to selectively pass between the plurality of retaining shelves (48) for receipt of the forward deck region (34) into the volume (44) and to selectively translate within the volume (44) for engagement by the plurality of retaining shelves (48) to operably retain the forward deck region (34) within the volume (44).

4. The vehicle (10) of claim 3, wherein the deck (24) comprises:
   a main body (50); and a cap (52) operably coupled to the main body (50) within the forward deck region (34), wherein the cap (52) defines the plurality of protrusions (38) and the plurality of notches (40).

5. The vehicle (10) of claim 4, wherein the main body (50) and the cap (52) are constructed of different materials.

6. The vehicle (10) of claim 4, wherein the cap (52) is constructed of a more rigid material than the main body (50).

7. The vehicle (10) of claim 4,
wherein the deck (24) further comprises a post (54) extending from the upper side (26) of the deck (24) within the forward deck region (34); and
wherein the post (54) is configured to be selectively engaged by the forward assembly (14) when the forward deck region (34) is operatively received in the volume (44) and the plurality of retaining shelves (48) are operably engaged with the plurality of protrusions (38) to operably maintain the forward deck region (34) in the volume (44).

8. The vehicle (10) of claim 2, wherein the forward assembly (14) and the rearward assembly (22) collectively define a quick-disconnect assembly (56) configured to selectively release and secure the rearward assembly (22) from and to the forward assembly (14).

9. The vehicle (10) of claim 8,
wherein the deck (24) has a forward deck region (34);
wherein the forward assembly (14) comprises:
a deck-receiving bracket (42) operably supported by the front frame assembly (16) and that defines a volume (44) configured to selectively receive the forward deck region (34); and
a lever (58) positioned and configured to be engaged by a user, wherein the lever (58) has an open position (60), in which the quick-disconnect assembly (56) permits the forward deck region (34) to be operably received and removed from the volume (44), and a closed position (62), in which the quick-disconnect assembly (56) restricts the forward deck region (34) from being removed from the volume (44) when the forward deck region (34) is operably received in the volume (44).

10. The vehicle (10) of claim 9, wherein the lever (58) is configured to be selectively locked in the closed position (62) to restrict transition to the open position (60).

11. The vehicle (10) of claim 1, wherein the rear wheel assembly (28) comprises:
a caster assembly (30) operably coupled to the deck (24) opposite the upper side (26); and
a truck assembly (32) operably coupled to the deck (24) opposite the upper side (26) and rearward of the caster assembly (30).

12. The vehicle (10) of claim 1,
wherein the front wheel (20) has a front-wheel axis (90) and a front-wheel ground-contacting surface (92);
wherein the rear wheel assembly (28) comprises:
a caster assembly (30) operably coupled to the deck (24) opposite the upper side (26), wherein the caster assembly (30) comprises a caster wheel (94) having a caster-wheel axis (96) and a caster-wheel ground-contacting surface (98); and
a truck assembly (32) operably coupled to the deck (24) opposite the upper side (26) and rearward of the caster assembly (30), wherein the truck assembly (32) comprises a pair of truck wheels (100), wherein each truck wheel (100) has a truck-wheel axis (102) and a truck-wheel ground-contacting surface (104), and wherein each truck wheel (100) has a truck-wheel center plane (112) that bisects the truck-wheel ground-contacting surface (104);
wherein when (i) the front-wheel axis (90) and the caster-wheel axis (96) are parallel to a planar ground surface (106), (ii) the front-wheel ground-contacting surface (92) and the caster-wheel ground-contacting surface (98) are engaged with the planar ground surface (106), and (iii) the truck assembly (32) is in a neutral configuration:
the truck-wheel ground-contacting surface (104) and/or the truck-wheel axis (102) of each truck wheel (100) is at a truck-wheel angle (108) relative to the planar ground surface (106);
the vehicle (10) has a vehicle center plane (110) that bisects the vehicle (10) and that is perpendicular to the planar ground surface (106);
a closest distance from an intersection (114) of the truck-wheel center plane (112) and the truck-wheel ground-contacting surface (104) closest to the planar ground surface (106) to the vehicle center plane (110) is a truck-wheel track (116);
a closest distance from the intersection (114) to the planar ground surface (106) is a truck-wheel height (118); and
a closest distance from the lower side (27) of the deck (24) to the planar ground surface (106) is a deck height (119); and
wherein the truck-wheel angle (108) is non-zero.

13. The vehicle (10) of claim 12, wherein the truck-wheel angle (108) is about 1.2 degrees (°).

14. The vehicle (10) of claim 12, wherein the truck-wheel track (116) is 150-500 millimeters (mm).

15. The vehicle (10) of claim 12, wherein the truck-wheel height (118) is 5-80 mm.

16. The vehicle (10) of claim 12, wherein a ratio of the truck-wheel track (116) to the truck-wheel height (118) is 15-30.

17. The vehicle (10) of claim 12, wherein a ratio of the truck-wheel track (116) to the deck height (119) is 1-5.

18. The vehicle (10) of claim 12, wherein a ratio of the deck height (119) to the truck-wheel height (118) is 5-20.

19. A vehicle (10) for riding along a ground surface (12), comprising:
a forward assembly (14) comprising:
a front frame assembly (16) comprising a head tube (68);
a steering assembly (18) pivotally supported by the front frame assembly (16) and comprising a steering tube (70) rotatably extending through the head tube (68);
a front wheel (20) operably coupled to the steering tube (70) and positioned to engage the ground surface (12); and
a limiter (72) configured to selectively limit rotation of the steering tube (70) relative to the head tube (68), wherein the limiter (72) has a first configuration (74), in which the steering tube (70) is limited to an angular range of rotation relative to the head tube (68), and a second configuration (76), in which the steering tube (70) is limited to no rotation relative to the head tube (68); and
a rearward assembly (22) coupled to and extending rearward from the forward assembly (14), wherein the rearward assembly (22) comprises:
a deck (24) having an upper side (26) for supporting a rider in a standing position, and a lower side (27) opposite the upper side (26); and a rear wheel assembly (28) operably coupled to the deck (24) and positioned to engage the ground surface (12) when the front wheel (20) engages the ground surface (12);

wherein when the limiter (72) is in the second configuration (76), the front wheel (20) is parallel with the deck (24).

\* \* \* \* \*